United States Patent
Farrell et al.

(10) Patent No.: US 9,471,315 B2
(45) Date of Patent: Oct. 18, 2016

(54) RUN-TIME INSTRUMENTATION REPORTING

(75) Inventors: Mark S. Farrell, Pleasant Valley, NY (US); Charles W. Gainey, Jr., Poughkeepsie, NY (US); Marcel Mitran, Markham (CA); Chung-Lung K. Shum, Wappingers Falls, NY (US); Brian L. Smith, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 13/422,552

(22) Filed: Mar. 16, 2012

(65) Prior Publication Data
US 2013/0246755 A1    Sep. 19, 2013

(51) Int. Cl.
G06F 9/30    (2006.01)
G06F 11/36    (2006.01)
G06F 9/455    (2006.01)

(52) U.S. Cl.
CPC ......... G06F 9/30145 (2013.01); G06F 9/3005 (2013.01); G06F 11/3636 (2013.01); G06F 11/3648 (2013.01); G06F 9/45504 (2013.01)

(58) Field of Classification Search
CPC ........... G06F 11/3644; G06F 9/30145; G06F 11/3636; G06F 11/30; G06F 9/30; G06F 9/30076
See application file for complete search history.

(56) References Cited

U.S. PATENT DOCUMENTS 4,821,178 A    4/1989    Levin et al.
5,151,981 A    9/1992    Westcott et al.
5,341,500 A    8/1994    Moyer et al.
5,371,894 A    12/1994    Dibrino
(Continued)

FOREIGN PATENT DOCUMENTS

CN    1867893 A    11/2006
CN    1912849      2/2007
(Continued)

OTHER PUBLICATIONS

U.S. Appl. No. 13/422,596, Non-Final Office Action dated Jan. 31, 2014, 39 pages.
(Continued)

*Primary Examiner* — Eric Coleman
(74) *Attorney, Agent, or Firm* — Cantor Colburn LLP; William A. Kinnaman, Jr.

(57) ABSTRACT

An aspect includes run-time instrumentation reporting. An instruction stream is executed by a processor. Run-time instrumentation information of the executing instruction stream is captured by the processor. Run-time instrumentation records are created based on the captured run-time instrumentation information. A run-time instrumentation sample point of the executing instruction stream on the processor is detected. A reporting group is stored in a run-time instrumentation program buffer. The storing is based on the detecting and the storing includes: determining a current address of the run-time instrumentation program buffer, the determining based on instruction accessible run-time instrumentation controls; and storing the reporting group into the run-time instrumentation program buffer based on an origin address and the current address of the run-time instrumentation program buffer, the reporting group including the created run-time instrumentation records.

13 Claims, 22 Drawing Sheets

(56) References Cited

U.S. PATENT DOCUMENTS

| | | | |
|---|---|---|---|
| 5,386,565 A | 1/1995 | Tanaka et al. | |
| 5,491,793 A | 2/1996 | Somasundaram et al. | |
| 5,553,293 A | 9/1996 | Andrews et al. | |
| 5,608,866 A | 3/1997 | Horikawa | |
| 5,675,768 A | 10/1997 | Tran et al. | |
| 5,675,817 A | 10/1997 | Moughanni et al. | |
| 5,737,516 A | 4/1998 | Circello et al. | |
| 5,768,500 A | 6/1998 | Agrawal et al. | |
| 5,796,939 A | 8/1998 | Berc et al. | |
| 5,809,325 A | 9/1998 | Hinton et al. | |
| 5,887,189 A * | 3/1999 | Birns | G06F 9/5016 711/202 |
| 5,944,841 A * | 8/1999 | Christie | 714/38.11 |
| 5,960,198 A | 9/1999 | Roediger et al. | |
| 5,964,893 A | 10/1999 | Circello et al. | |
| 5,978,902 A | 11/1999 | Mann | |
| 5,987,249 A | 11/1999 | Grossman et al. | |
| 6,077,312 A | 6/2000 | Bates et al. | |
| 6,094,729 A | 7/2000 | Mann | |
| 6,145,123 A * | 11/2000 | Torrey et al. | 717/128 |
| 6,154,818 A | 11/2000 | Christie | |
| 6,158,049 A | 12/2000 | Goodwin et al. | |
| 6,161,196 A | 12/2000 | Tsai | |
| 6,163,840 A | 12/2000 | Chrysos et al. | |
| 6,216,237 B1 | 4/2001 | Klemm et al. | |
| 6,243,836 B1 * | 6/2001 | Whalen | 714/45 |
| 6,321,329 B1 | 11/2001 | Jaggar et al. | |
| 6,378,125 B1 | 4/2002 | Bates et al. | |
| 6,519,766 B1 | 2/2003 | Barritz et al. | |
| 6,539,500 B1 | 3/2003 | Kahle et al. | |
| 6,574,727 B1 | 6/2003 | Davidson et al. | |
| 6,631,518 B1 | 10/2003 | Bortnikov et al. | |
| 6,634,020 B1 | 10/2003 | Bates et al. | |
| 6,769,054 B1 * | 7/2004 | Sahin et al. | 711/162 |
| 6,918,065 B1 | 7/2005 | Edwards et al. | |
| 6,918,110 B2 * | 7/2005 | Hundt et al. | 717/158 |
| 6,961,927 B1 | 11/2005 | Erb et al. | |
| 6,978,462 B1 | 12/2005 | Adler et al. | |
| 7,013,456 B1 | 3/2006 | Van Dyke et al. | |
| 7,047,520 B2 | 5/2006 | Moore et al. | |
| 7,047,521 B2 | 5/2006 | Bunnell | |
| 7,080,289 B2 | 7/2006 | Swaine et al. | |
| 7,103,877 B1 | 9/2006 | Arnold et al. | |
| 7,137,105 B2 | 11/2006 | Madsen et al. | |
| 7,181,600 B1 | 2/2007 | Uhler | |
| 7,239,980 B2 | 7/2007 | DeWitt, Jr. et al. | |
| 7,500,152 B2 | 3/2009 | Moyer et al. | |
| 7,716,335 B2 | 5/2010 | Dinker et al. | |
| 7,735,072 B1 | 6/2010 | Altman et al. | |
| 7,814,466 B2 | 10/2010 | Chen et al. | |
| 7,870,438 B2 * | 1/2011 | Bartik et al. | 714/45 |
| 7,904,460 B2 | 3/2011 | Armour et al. | |
| 7,962,314 B2 | 6/2011 | Chernoff | |
| 8,141,052 B2 | 3/2012 | Guarraci | |
| 8,307,345 B2 | 11/2012 | Sunkara et al. | |
| 8,312,253 B2 | 11/2012 | Circello et al. | |
| 8,473,925 B2 | 6/2013 | Gagliardi et al. | |
| 8,572,577 B2 | 10/2013 | Bates et al. | |
| 8,707,314 B2 | 4/2014 | Gummaraju et al. | |
| 2002/0046305 A1 | 4/2002 | Babaian et al. | |
| 2003/0005423 A1 * | 1/2003 | Chen et al. | 717/154 |
| 2003/0084375 A1 | 5/2003 | Moore et al. | |
| 2003/0149961 A1 | 8/2003 | Kawai et al. | |
| 2003/0154430 A1 | 8/2003 | Allen et al. | |
| 2004/0019886 A1 | 1/2004 | Berent et al. | |
| 2004/0133882 A1 | 7/2004 | Angel et al. | |
| 2004/0139304 A1 | 7/2004 | Arimilli et al. | |
| 2004/0268315 A1 | 12/2004 | Gouriou et al. | |
| 2005/0034017 A1 | 2/2005 | Airaud et al. | |
| 2005/0120337 A1 | 6/2005 | Serrano et al. | |
| 2005/0198466 A1 | 9/2005 | Estlick et al. | |
| 2005/0228631 A1 | 10/2005 | Maly et al. | |
| 2006/0101416 A1 | 5/2006 | Callahan et al. | |
| 2006/0184832 A1 | 8/2006 | Floyd et al. | |
| 2006/0190930 A1 | 8/2006 | Hecht et al. | |
| 2006/0236067 A1 | 10/2006 | Attinella et al. | |
| 2006/0242627 A1 | 10/2006 | Wygodny et al. | |
| 2006/0248515 A1 | 11/2006 | Qadeer et al. | |
| 2006/0259822 A1 | 11/2006 | Swoboda | |
| 2006/0259824 A1 | 11/2006 | Sohm et al. | |
| 2006/0259830 A1 | 11/2006 | Blevin et al. | |
| 2006/0267818 A1 | 11/2006 | Agarwala | |
| 2006/0277441 A1 * | 12/2006 | Edgar et al. | 714/38 |
| 2007/0006172 A1 | 1/2007 | Swoboda et al. | |
| 2007/0079177 A1 | 4/2007 | Spirakis et al. | |
| 2007/0143755 A1 | 6/2007 | Sahu et al. | |
| 2007/0186056 A1 | 8/2007 | Saha et al. | |
| 2007/0214342 A1 | 9/2007 | Newburn et al. | |
| 2007/0260849 A1 | 11/2007 | Chen et al. | |
| 2007/0261032 A1 | 11/2007 | Chen et al. | |
| 2007/0261033 A1 * | 11/2007 | Chen et al. | 717/130 |
| 2007/0288900 A1 | 12/2007 | Lev et al. | |
| 2008/0005730 A1 | 1/2008 | Inamdar | |
| 2008/0098364 A1 | 4/2008 | Gray-Donald et al. | |
| 2008/0114806 A1 | 5/2008 | Kosche | |
| 2008/0189529 A1 * | 8/2008 | Bohizic et al. | 712/227 |
| 2008/0222382 A1 | 9/2008 | Snyder | |
| 2008/0250275 A1 | 10/2008 | Walker | |
| 2008/0250397 A1 | 10/2008 | Dahms et al. | |
| 2009/0037887 A1 * | 2/2009 | Chavan | 717/128 |
| 2009/0113398 A1 * | 4/2009 | Birkill et al. | 717/128 |
| 2009/0150890 A1 | 6/2009 | Yourst | |
| 2009/0157359 A1 | 6/2009 | Chernoff | |
| 2009/0178036 A1 | 7/2009 | Levine | |
| 2009/0204794 A1 | 8/2009 | Busaba et al. | |
| 2009/0210752 A1 | 8/2009 | Bartik et al. | |
| 2009/0320001 A1 | 12/2009 | Bates et al. | |
| 2010/0064279 A1 | 3/2010 | Stewart | |
| 2010/0077143 A1 | 3/2010 | Reid et al. | |
| 2010/0088771 A1 | 4/2010 | Heller et al. | |
| 2010/0146220 A1 | 6/2010 | Panchenko et al. | |
| 2010/0191917 A1 | 7/2010 | Archer et al. | |
| 2010/0229043 A1 | 9/2010 | Saha et al. | |
| 2010/0242025 A1 | 9/2010 | Yamazaki et al. | |
| 2010/0281464 A1 | 11/2010 | Vajapeyam | |
| 2010/0293342 A1 | 11/2010 | Morfey et al. | |
| 2010/0312992 A1 | 12/2010 | Wakabayashi et al. | |
| 2010/0318994 A1 | 12/2010 | Holmberg et al. | |
| 2011/0145498 A1 | 6/2011 | Taillefer et al. | |
| 2011/0145512 A1 | 6/2011 | Adl-Tabatabai et al. | |
| 2011/0153960 A1 | 6/2011 | Rajwar | |
| 2011/0154298 A1 | 6/2011 | Alexander et al. | |
| 2011/0154299 A1 | 6/2011 | Kim et al. | |
| 2011/0173588 A1 | 7/2011 | Salapura et al. | |
| 2011/0283264 A1 | 11/2011 | Gagliardi | |
| 2011/0283265 A1 | 11/2011 | Gagliardi et al. | |
| 2011/0302569 A1 | 12/2011 | Kunze et al. | |
| 2011/0314342 A1 | 12/2011 | Gilkerson et al. | |
| 2012/0167057 A1 | 6/2012 | Schmich et al. | |
| 2012/0311273 A1 | 12/2012 | Marathe et al. | |

FOREIGN PATENT DOCUMENTS

| | | |
|---|---|---|
| CN | 101021800 A | 8/2007 |
| CN | 101165658 A | 4/2008 |
| CN | 101278265 | 10/2008 |
| CN | 101952806 A | 1/2011 |
| EP | 0257241 | 3/1988 |
| EP | 0919919 | 6/1999 |
| EP | 2048578 | 4/2009 |
| JP | 64021546 A | 1/1989 |
| JP | 1145736 A | 6/1989 |
| JP | 7013806 A | 1/1995 |
| JP | 8050556 A | 2/1996 |
| JP | 9265407 A | 10/1997 |
| JP | 9282196 A | 10/1997 |
| JP | 2001051874 | 2/2001 |
| JP | 2002252163 | 9/2002 |
| JP | 2002342114 | 11/2002 |
| JP | 2010086520 A | 4/2010 |

(56) References Cited

FOREIGN PATENT DOCUMENTS

| WO | WO2007145903 | 12/2007 |
|----|--------------|---------|
| WO | WO2010144757 | 12/2010 |

OTHER PUBLICATIONS

BJ Bruetsch, et al., Hardward Assist for Program Event Recording, http://www.ip.com/pubview/IPCOM000059699D; Jan. 1, 1986, 3 pages.
RJ Bullions, et al., Dynamic Enabling/Disabling of Program Event Recording Range Compare, IBM Technical Disclosure Bulletin, vol. 20, No. 9, 1978, 3 pages.
C.R. Conklin, et al., Forced Enablement of Program Event Recording for a Guest, Including a BC-Mode Guest, http://www.ip.com/pubview/IPCOM000117262D; Jan. 1, 1996, 3 pages.
K. Getzlaff, et al., Hardware-Implemented Program Event Recording, http://ww.ip.com;pubview/IPCOM000121669D; Sep. 1, 1991, 4 pages.
Matthew C. Merten et al. "A Hardware-Driven Profiling Scheme for Identifying Program Hot Spots to Support Runtime Optimization"; Appears in Proceedings of the 26th Annual Intl. Symposium on Compjer Architecture (ISCA); pp. 136-147; May 1999.
FE Sakalay, Program Event Recording, IBM Technical Disclosure Bulletin, vol. 15, No. 4, Sep. 1972, 3 pages.
z/Architecture: "Principles of Operation"; Sixth Edition, Apr. 2007, Publication No. SA22-7832-08, copyright IBM Corp.
U.S. Appl. No. 13/422,563, Non-Final Office Action dated Mar. 27, 2014, 41 pages.
U.S. Appl. No. 13/422,546; Non-Final Office Action; Date Filed: Mar. 16, 2012; Date Mailed: Apr. 15, 2014; 32 pages.
International Application No. PCT/JP2013/001224; International Search Report and Written Opinion dated May 7, 2013, 7 pages.
International Application No. PCT/JP2013/001267, International Search Report and Written Opinion dated May 14, 2013, 8 pages.
U.S. Appl. No. 13/422,532, Non-Final Office Action dated Jun. 3, 2014, 34 pages.
U.S. Appl. No. 13/422,542, Non-Final Office Action dated May 23, 2014, 31 pages.
U.S. Appl. No. 13/784,868, Non-Final Office Actin dated May 14, 2014, 33 pages.
U.S. Appl. No. 13/784,872, Non-Final Office Action dated May 8, 2014, 32 pages.
U.S. Appl. No. 13/422,596, Final Office Action dated Jun. 18, 2014, 28 pages.
International Search Report for International Application No. PCT/JP2013/001013; International Filing Date Feb. 22, 2013; Date of Mailing: May 14, 2013; 2 pages.
International Search Report for International Application No. PCT/JP2013/001240; International Filing Date Feb. 28, 2013; Date of Mailing: May 14, 2013; 3 pages.
International Search Report for International Application No. PCT/JP2013/001262; International Filing Date Mar. 1, 2013; Date of Mailing: May 7, 2013; 2 pages.
International Search Report for International Application No. PCT/JP2013/001264; International Filing Date Mar. 1, 2013; Date of Mailing: May 14, 2013; 3 pages.
International Search Report for International Application No. PCT/JP2013/001268; International Filing Date Mar. 1, 2013; Date of Mailing: May 7, 2013; 2 pages.
International Application No. PCT/JP2013/001009 International Search Report and Written Opinion dated May 14, 2013, 5 pages.
International Application No. PCT/JP2013/001016 International Search Report and Written Opinion dated May 14, 2013, 6 pages.
International Application No. PCT/JP2013/001379 International Search Report and Written Opinion dated May 14, 2013, 5 pages.
International Application No. PCT/JP2013/001412 International Search Report and Written Opinion dated May 14, 2013, 6 pages.
International Application No. PCT/JP2013/001464 International Search Report and Written Opinion dated May 14, 2013, 5 pages.
Written Opinion of the International Searching Authority for International Application No. PCT/JP2013/001013 mailed May 14, 2013; 3 pages.
Written Opinion of the International Searching Authority for International Application No. PCT/JP2013/001240 mailed May 14, 2013; 3 pages.
Written Opinion of the International Searching Authority for International Application No. PCT/JP2013/001262 mailed May 7, 2013; 3 pages.
Written Opinion of the International Searching Authority for International Application No. PCT/JP2013/001264 mailed May 14, 2013; 3 pages.
Written Opinion of the International Searching Authority for International Application No. PCT/JP2013/001268 mailed May 7, 2013; 3 pages.
Yoshioka Hirotaka, Developing memory profiling tools, Interface, Aug. 1, 2003, Vo. 29, No. 8, pp. 132-142.
U.S. Appl. No. 13/422,588, Non-Final Office Action dated Jan. 15, 2014, 43 pages.
U.S. Appl. No. 13/788,490, Non-Final Office Action dated Jan. 16, 2014, 31 pages.
U.S. Appl. No. 13/422,538; Non-Final Office Action; Date Filed Mar. 16, 2012; Date Mailed Jan. 3, 2014; 32 pages.
U.S. Appl. No. 13/785,089; Non-Final Office Action; Date Filed: Mar. 5, 2013; Date Mailed Jan. 3, 2014; 28 pages.
U.S. Appl. No. 13/785,089; Notice of Allowance; Date Filed: Mar. 5, 2013; Date Mailed: Jul. 29, 2014; 31 pages.
U.S. Appl. No. 13/422,538; Notice of Allowance: Date Filed Mar. 16, 2012; Date Mailed: Jul. 29, 2014; 33 pages.
U.S. Appl. No. 13/422,542 Notice of Allowance dated Oct. 24, 2014, 25 pages.
U.S. Appl. No. 13/422,546; Notice of Allowance; Date Filed: Mar. 16, 2012; Date Mailed: Aug. 4, 2014; 16 pages.
U.S. Appl. No. 13/422,577, Non-Final Office Action; Date Filed Mar. 16, 2014; Date Mailed: Jul. 29, 2014; 58 pages.
U.S. Appl. No. 13/784,868; Final Office Action; Date Filed: Mar. 5, 2013; Date Mailed: Oct. 1, 2014; 46 pages.
U.S. Appl. No. 13/788,368 Non-Final Office Action dated Nov. 18, 2014, 47 pages.
U.S. Appl. No. 13/422,550 Non-Final Office Action dated Aug. 15, 2014, 46 pages.
U.S. Appl. No. 13/422,563 Final Office Action dated Aug. 14, 2014, 39 pages.
U.S. Appl. No. 13/422,588 Notice of Allowance dated Jul. 28, 2014, 74 pages.
U.S. Appl. No. 13/422,596 Notice of Allowance dated Oct. 7, 2014, 19 pages.
U.S. Appl. No. 13/788,490 Notice of Allowance dated Aug. 1, 2014, 27 pages.
U.S. Appl. No. 13/422,532, Notice of Allowance dated Nov. 3, 2014, 32 pages.
U.S. Appl. No. 13/784,872, Notice of Allowance dated Sep. 19, 2014, 43 pages.
EP Application No. 13760606 Extended European Search Report dated Dec. 11, 2014; 7 pages.
U.S. Appl. No. 13/422,538; Notice of Allowance; Date Filed: Mar. 16, 2012; Date Mailed: Dec. 23, 2014; 15 pages.
U.S. Appl. No. 13/422,577; Final Office Action; Date Filed: Mar. 16, 2012; Date Mailed: Dec. 15, 2014; 20 pages.
U.S. Appl. No. 13/785,089; Notice of Allowance; Date Filed: Mar. 5, 2013; Date Mailed: Dec. 24, 2014; 15 pages.
Intel, "IA-32 Intel Architecture Software Developer's Manual"; Jun. 2005; 13 pages.
U.S. Appl. No. 13/422,589; Non-Final Office Action; Date Filed: Mar. 16, 20112; Date Mailed: May 11, 2015; 72 pages.
U.S. Appl. No. 13/422,598; Non-Final Office Action, Date Filed: Mar. 16, 2012; Date Mailed: May 6, 2015; 73 pages.
U.S. Appl. No. 13/788,368 Final Office Action dated May 12, 2015, 25 pages. (I470124USC).
U.S. Appl. No. 13/792,276; Non-Final Office Action, Date Filed: Mar. 11, 2013; Date Mailed: May 14, 2015; 76 pages.
U.S. Appl. No. 13/792,283; Non-Final Office Action, Date Filed: Mar. 11, 2013; Date Mailed May 7, 2015; 86 pages.

(56) References Cited

OTHER PUBLICATIONS

Anonymous Disclosed: "Embedded Trace Macrocell—ETMv1.0 to ETMv3.5" Architecture Specification, ARM, Jan. 2011, pp. 1-420.
EP Application No. 13760362.7 Extended European Search Report dated Apr. 8, 2015, 5 pages.
EP Application No. 13761389.9 Extended European Search Report dated Apr. 8, 2015, 8 pages.
European Application No. 13760324.7 Extended European Search Report dated Jan. 28, 2015, 7 pages.
European Application No. 13760760.2 Extended European Search Report dated Mar. 30, 2015, 8 pages.
European Application No. 13761271.9 Extended European Search Report dated Mar. 2, 2015 for POU920120002EP1, 7 pages.
European Patent Application No. 13762008.4 Extended European Search Report dated Mar. 16, 2015, 7 pages.
European Patent Application No. 13760503.6 Extended European Search Report dated Mar. 6, 2015, 6 pages.
European Patent Application No. 13760531.7 Extended European Search Report dated Mar. 9, 2015; 7 pages.
European Patent Application No. 13761846.8 Supplemental EP Search Report Mailed Mar. 9, 2015, 7 pages.
Gschwind, et al., "Binary Translation and Architecture Convergence Issues for IBM System/390," International Conference on Supercomputing, Conference Proceedings, ACM, New York, May 8, 2000, 12 pages.
U.S. Appl. No. 13/422,538; Notice of Allowance: Date Filed: Mar. 16, 2012; Date Mailed: Apr. 6, 2015; 26 pages.
U.S. Appl. No. 13/422,542 Non-Final Office Action dated Feb. 2, 2015, 15 pages.
U.S. Appl. No. 13/422,546; Non-Final Office Action; Date Filed: Mar. 16, 2012; Date Mailed: Jan. 14, 2015; 27 pages.
U.S. Appl. No. 13/422,550 Notice of Allowance dated Dec. 24, 2014, 18 pages.
U.S. Appl. No. 13/422,577; Notice of Allowance; Date Filed Mar. 16, 2012; Date Mailed: Mar. 4, 2015; 14 pages.
U.S. Appl. No. 13/788,490; Notice of Allowance; Date Filed: Mar. 7, 2013, Date Mailed: Apr. 1, 2015; 20 pages.
U.S. Appl. No. 13/422,588; Notice of Allowance: Date Filed: Mar. 16, 2012; Date Mailed: Mar. 12, 2015; 15 pages.
U.S. Appl. No. 13/785,089; Notice of Allowance; Date Filed: Mar. 5, 2013; Date Mailed: Apr. 24, 2015; 34 pages.
Extended European Search Report, POU920120015EP1, Mailing Date: Jun. 25, 2015; 8 pages.
Hassan Shojania, "Hardware-based performance monitoring with VTune Performance Analyzerunder Linux", 2003, pp. 1-12.
U.S. Appl. No. 13/788,368 Non-Final Office Action dated Sep. 9, 2015, 22 pages.
William E. Cohen, "Tuning Programs with OProfile", Wide Open Magazine, 2004, pp. 53-61.
Chinese Office Action for Chinese Application No. 201380014676.X, Mailed Apr. 18, 2016; 11 pages.
Chinese Office Action for Chinese Application Serial No. 201380014669.X, Mailed Apr. 14, 2016, 9 pages.
Chinese Office Action for Chinese Application No. 201380014658.1, Mailed Jul. 22, 2016.

\* cited by examiner

900

| Record No. | Record Type(s) | Section |
|---|---|---|
| 0 | Begin, Timestamp | Header — 902 |
| 1 | Emit, TX Abort, Call, Return, Branch, Filler | Body — 904 |
| 2 | | |
| 3 | | |
| $R_{RG}-R_{NC}$ (=4) | | |
| $R_{RG}-R_{NC}+1$ (=5) | Extra, Model-Dependent | Extra — 906 |
| $R_{RG}-2$ (=6) | | |
| $R_{RG}-1$ | Instruction | Footer — 908 |

FIG. 9

RUN-TIME INSTRUMENTATION REPORTING

BACKGROUND

The present invention relates generally to processing within a computing environment, and more specifically, to run-time instrumentation reporting.

Computer processors execute transactions using increasingly complex branch prediction and instruction caching logic. These processes have been introduced to increase instruction throughput, and therefore processing performance. The introduction of logic for improving performance makes it difficult to predict with certainty how a particular software application will execute on the computer processor. During the software development process there is often a balance between functionality and performance. Software is executed at one or more levels of abstraction from the underlying hardware that is executing the software. When hardware is virtualized, an additional layer of abstraction is introduced. With the introduction of performance enhancing logic, and the various layers of abstraction it is difficult to have a thorough understanding of what is actually occurring at the hardware level when a program is executing. Without this information, software developers use more abstract methods, such as execution duration, memory usage, number of threads, etc., for optimizing the software application.

When hardware specific information is available, it is typically provided to a developer after the fact and it is provided in aggregate, at a high level, and/or interspersed with the activity of other programs, and the operating system, making it difficult to identify issues that may be impacting the efficiency and accuracy of the software application.

SUMMARY

Embodiments include a computer program product, and system for run-time instrumentation reporting. An instruction stream is executed by a processor. Run-time instrumentation information of the executing instruction stream is captured by the processor. Run-time instrumentation records are created based on the captured run-time instrumentation information. A run-time instrumentation sample point of the executing instruction stream on the processor is detected. A reporting group is stored in a run-time instrumentation program buffer. The storing is based on the detecting and the storing includes: determining a current address of the run-time instrumentation program buffer, the determining based on instruction accessible run-time instrumentation controls; and storing the reporting group into the run-time instrumentation program buffer based on an origin address and the current address of the run-time instrumentation program buffer, the reporting group including the created run-time instrumentation records.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 9 depicts a reporting group in accordance with an embodiment;

DETAILED DESCRIPTION

An embodiment of the present invention is a hardware based run-time instrumentation facility for managed run-times. As used herein the term "managed run-time" refers to an environment that encapsulates a state and manages resources used to execute a program or application (e.g., Java® virtual machine or "JVM", operating system, middleware, etc.). Embodiments of the run-time instrumentation facility enable a program to collect information about program execution, including central processing unit (CPU) data. The collected information allows the program to acquire insights about the program from which the information is collected. Embodiments of the run-time instrumentation facility include a hardware facility for collecting sequences of events (e.g., taken branches, register values, etc.) in a collection buffer. Contents of the collection buffer (or a subset of the collection buffer containing the most recent records) are copied into a program buffer in the application's address space (for example the address space of a JVM) upon a programmable set of sample triggering events such as, but not limited to: a software directive in the form of an instruction inserted into the instruction stream; an interval of executed instructions are completed, a given elapsed time since the last sample expired, and/or a given hardware event such as data or instruction cache miss is observed.

The data stored at each sample point is stored as a set of related records, referred to herein as a reporting group. A reporting group is stored into the program buffer whose location is determined from controls associated with the run-time instrumentation. Thus, instrumented data stored as reporting groups in the program buffer are available to the program for post-analysis (or even aggressive analysis during run-time instrumentation).

Dynamic compilers may exploit run-time information, such as that collected by the hardware based run-time instrumentation facility described herein to perform online feedback directed optimizations. For example, information about important execution paths, profiled values and preferred branch directions can be used by a dynamic compiler to perform optimizations that specialize or version code, direct in-lining, re-order execution paths, and straighten branches. Embodiments described herein are not limited to use by compilers and may be used in variety of manners such as, but not limited to, for directing other managed run-time facilities. For example, data cache events can be used to help a garbage collector process make decisions about co-locating or distancing objects to gain better data locality or avoid false sharing problems.

Figure 1A:
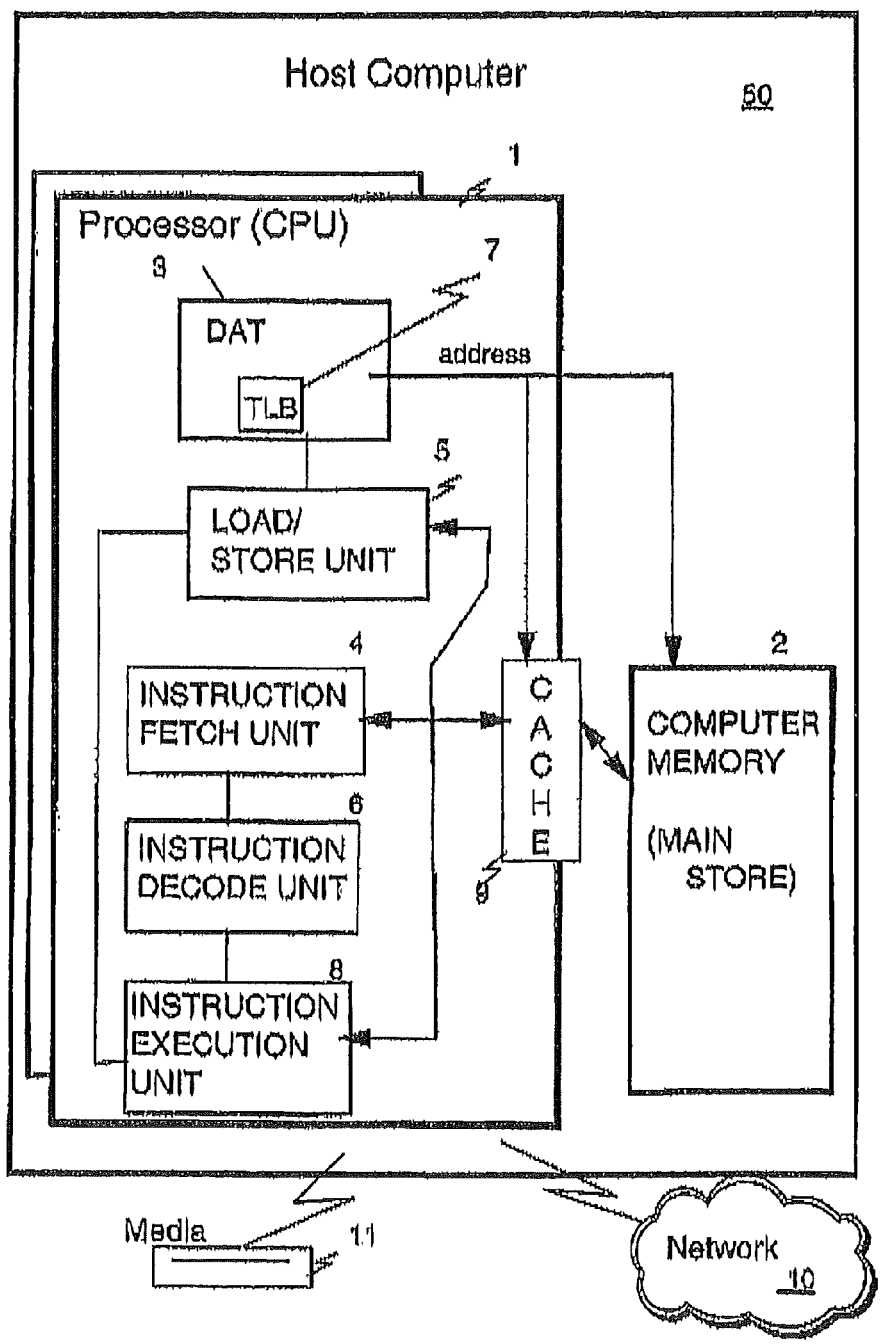
FIG. 1A is a diagram depicting an example host computer system in an embodiment.

FIG. 1A, depicts the representative components of a host computer system 50 in an embodiment. Other arrangements of components may also be employed in a computer system. The representative host computer system 50 comprises one or more processors 1 in communication with main store (computer memory) 2 as well as I/O interfaces to storage devices 11 and networks 10 for communicating with other computers or SANs and the like. The processor 1 is compliant with an architecture having an architected instruction set and architected functionality. The processor 1 may have dynamic address translation (DAT) 3 for transforming program addresses (virtual addresses) into a real address in memory. A DAT 3 typically includes a translation lookaside buffer (TLB) 7 for caching translations so that later accesses to the block of computer memory 2 do not require the delay of address translation. Typically a cache 9 is employed between the computer memory 2 and the processor 1. The cache 9 may be hierarchical having a large cache available to more than one CPU and smaller, faster (lower level) caches between the large cache and each CPU. In some embodiments, the lower level caches are split to provide separate low level caches for instruction fetching and data accesses. In an embodiment, an instruction is fetched from the computer memory 2 by an instruction fetch unit 4 via the cache 9. The instruction is decoded in an instruction decode unit 6 and dispatched (with other instructions in some embodiments) to instruction execution units 8. Typically several instruction execution units 8 are employed, for example an arithmetic execution unit, a floating point execution unit and a branch instruction execution unit. The instruction is executed by the instruction execution unit 8, accessing operands from instruction specified registers or the computer memory 2 as needed. If an operand is to be accessed (loaded or stored) from the computer memory 2, the load store unit 5 typically handles the access under control of the instruction being executed. Instructions may be executed in hardware circuits or in internal microcode (firmware) or by a combination of both.

Figure 1B:
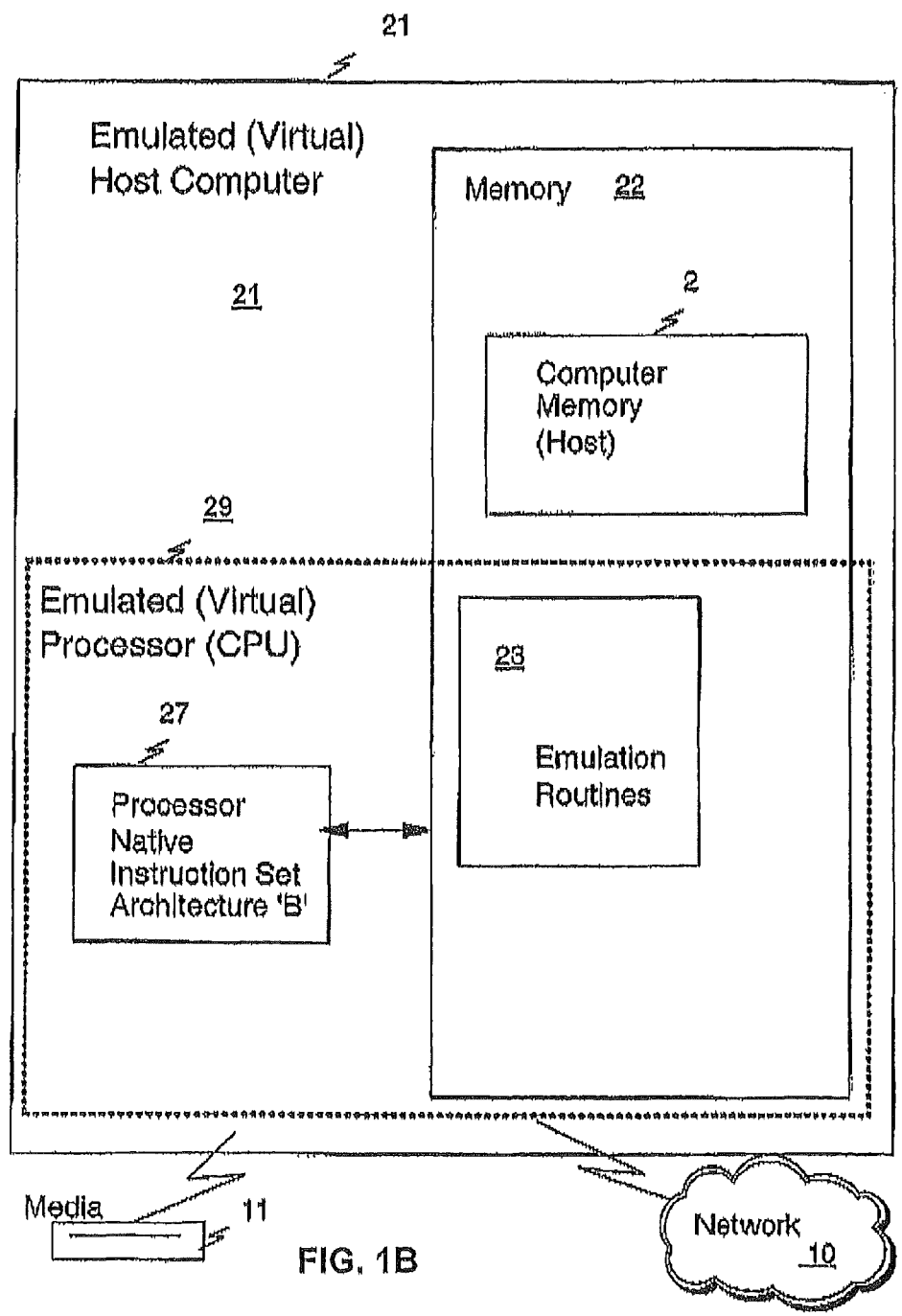
FIG. 1B is a diagram depicting an example emulation host computer system in an embodiment.

In FIG. 1B, depicts an emulated host computer system 21 is provided that emulates a host computer system of a host architecture, such as the host computer system 50 of FIG. 1. In the emulated host computer system 21, a host processor (CPU) 1 is an emulated host processor (or virtual host processor) 29, and comprises a native processor 27 having a different native instruction set architecture than that of the processor 1 of the host computer system 50. The emulated host computer system 21 has memory 22 accessible to the native processor 27. In an embodiment, the memory 22 is partitioned into a computer memory 2 portion and an emulation routines memory 23 portion. The computer memory 2 is available to programs of the emulated host computer system 21 according to the host computer architecture. The native processor 27 executes native instructions of an architected instruction set of an architecture other than that of the emulated processor 29, the native instructions obtained from the emulation routines memory 23, and may access a host instruction for execution from a program in the computer memory 2 by employing one or more instruction(s) obtained in a sequence & access/decode routine which may decode the host instruction(s) accessed to determine a native instruction execution routine for emulating the function of the host instruction accessed. Other facilities that are defined for the host computer system 50 architecture may be emulated by architected facilities routines, including such facilities as general purpose registers, control registers, dynamic address translation and input/output (I/O) subsystem support and processor cache for example. The emulation routines may also take advantage of function available in the native processor 27 (such as general registers and dynamic translation of virtual addresses) to improve performance of the emulation routines. Special hardware and off-load engines may also be provided to assist the native processor 27 in emulating the function of the host computer system 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can be used as well as machines which use emulation by Hercules, UMX, Fundamental Software, Inc. (FSI) or Platform Solutions, Inc. (PSI), where generally execution is in an emulation mode. In emulation mode, emulation software is executed by a native processor to emulate the architecture of an emulated processor.

One or more of the components of the emulated host computer system 21 are further described in "IBM® z/Architecture Principles of Operation," Publication No. SA22-7832-08, 9th Edition, August, 2010 which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

The native processor 27 typically executes emulation software stored in the emulation routines memory 23 comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor 27. These converted instructions may be cached such that a faster conversion can be accomplished. The emulation software maintains the architecture rules of the emulated processor architecture so as to assure operating systems and applications written for the emulated processor operate correctly. Furthermore the emulation software provides resources identified by the emulated processor architecture including, but not limited to control registers, general purpose registers, floating point registers, dynamic address translation function including segment tables and page tables for example, interrupt mechanisms, context switch mechanisms, time of day (TOD) clocks and architected interfaces to I/O subsystems such that an operating system or an application program designed to run on the emulated processor 29, can be run on the native processor 27 having the emulation software.

A specific instruction being emulated is decoded, and a subroutine called to perform the function of the individual instruction. An emulation software function emulating a function of an emulated processor 29 is implemented, for example, in a "C" subroutine or driver, or some other method of providing a driver for the specific hardware as will be within the skill of those in the art after understanding the description of the preferred embodiment.

In an embodiment, the invention may be practiced by software (sometimes referred to licensed internal code, firmware, micro-code, milli-code, pico-code and the like, any of which would be consistent with the present invention). Referring to FIG. 1A, software program code which embodies the present invention is accessed by the processor also known as a CPU (Central Processing Unit) 1 of the host computer system 50 from the storage device 11 such as a long-term storage media, a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the computer memory 2, and accessed by the processor 1 using a processor bus (not shown). Such program code includes an operating system which controls the function and interaction of the various computer components and one or more application programs. Program code is normally paged from a dense media such as the storage device 11 to computer memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, Magnetic Tape and the like is often referred to as a "computer program product." The computer program product medium is typically readable by a processing circuit preferably in a computer system for execution by the processing circuit.

Figure 1C:
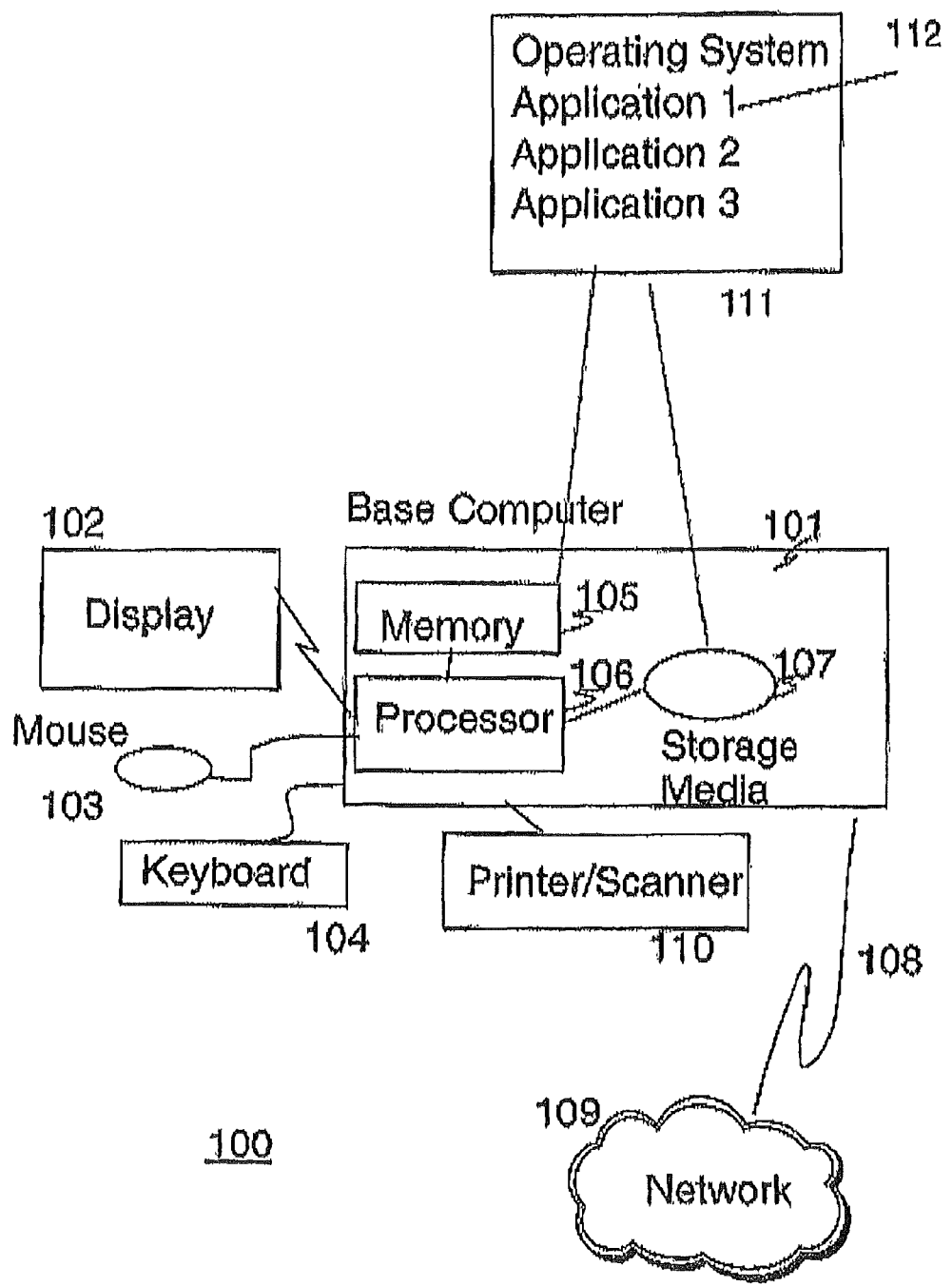
FIG. 1C is a diagram depicting an example computer system in an embodiment.

FIG. 1C illustrates a representative workstation or server hardware system in which the present invention may be practiced. The system 100 of FIG. 1C comprises a representative base computer system 101, such as a personal computer, a workstation or a server, including optional peripheral devices. The base computer system 101 includes one or more processors 106 and a bus (not shown) employed to connect and enable communication between the one or more processors 106 and the other components of the base computer system 101 in accordance with known techniques. The bus connects the processor 106 to memory 105 and long-term storage 107 which may include a hard drive (including any of magnetic media, CD, DVD and Flash Memory for example) or a tape drive for example. The base computer system 101 may also include a user interface adapter, which connects the one or more processors 106 via the bus to one or more interface devices, such as a keyboard 104, a mouse 103, a printer/scanner 110 and/or other interface devices, which may be any user interface device, such as a touch sensitive screen, digitized entry pad, etc. The bus also connects the one or more processors to a display device 102, such as an LCD screen or monitor via a display adapter.

The base computer system 101 may communicate with other computers or networks of computers by way of a network adapter capable of communicating 108 with a network 109. Example network adapters are communications channels, token ring, Ethernet or modems. Alternatively, the base computer system 101 may communicate using a wireless interface, such as a cellular digital packet data (CDPD) card. The base computer system 101 may be associated with such other computers in a local area network (LAN) or a wide area network (WAN), or the base computer system 101 may be a client in a client/server arrangement with another computer, etc.

Figure 2:
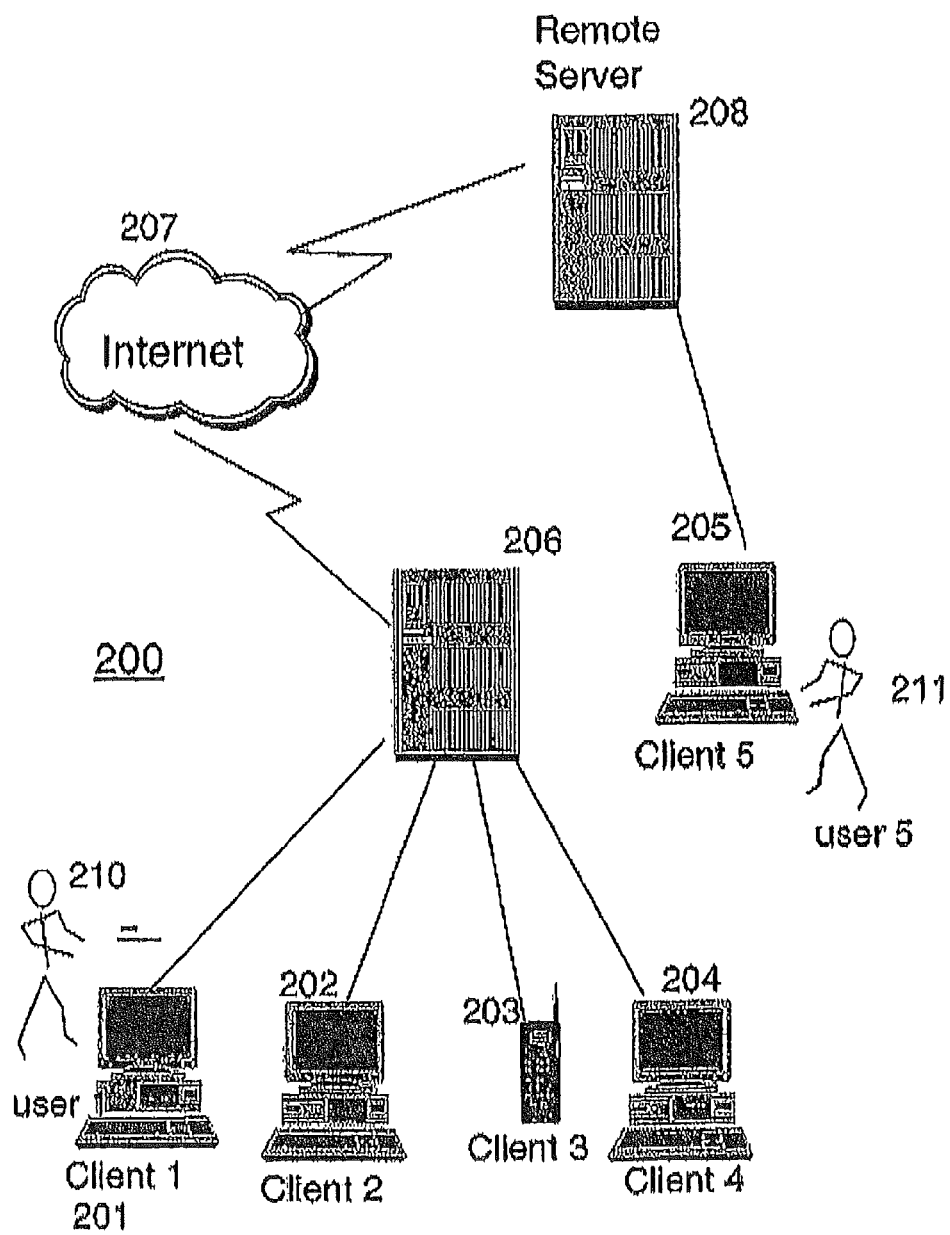
FIG. 2 is a diagram depicting an example computer network in an embodiment.

FIG. 2 illustrates a data processing network 200 in which the present invention may be practiced. The data processing network 200 may include a plurality of individual networks, such as a wireless network and a wired network, each of which may include a plurality of individual workstations 201, 202, 203, 204 and or the base computer system 101 of FIG. 1C. Additionally, as those skilled in the art will appreciate, one or more LANs may be included, where a LAN may comprise a plurality of intelligent workstations coupled to a host processor.

Programming code 111 may be embodied in the memory 105, and accessed by the processor 106 using the processor bus. Such programming code includes an operating system which controls the function and interaction of the various computer components and one or more application programs 112. Program code is normally paged from long-term storage 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Still referring to FIG. 2, the networks may also include mainframe computers or servers, such as a gateway computer (client server) 206 or application server (remote server) 208 which may access a data repository and may also be accessed directly from a workstation 205. A gateway computer 206 serves as a point of entry into each network 207. A gateway is needed when connecting one networking protocol to another. The gateway computer 206 may be preferably coupled to another network (the Internet 207 for example) by means of a communications link. The gateway computer 206 may also be directly coupled to the one or more workstations 101, 201, 202, 203, and 204 using a communications link. The gateway computer may be implemented utilizing an IBM eServer™ zSeries® z9® Server available from International Business Machines Corporation.

In an embodiment, software programming code which embodies the present invention is accessed by the processor 106 of the base computer system 101 from long-term storage media, such as the long-term storage 107 of FIG. 1C. The software programming code may be embodied on any of a variety of known media for use with a data processing system, such as a diskette, hard drive, or CD-ROM. The code may be distributed on such media, or may be distributed to users 210 and 211 from the memory or storage of one computer system over a network to other computer systems for use by users of such other systems.

Figure 3:
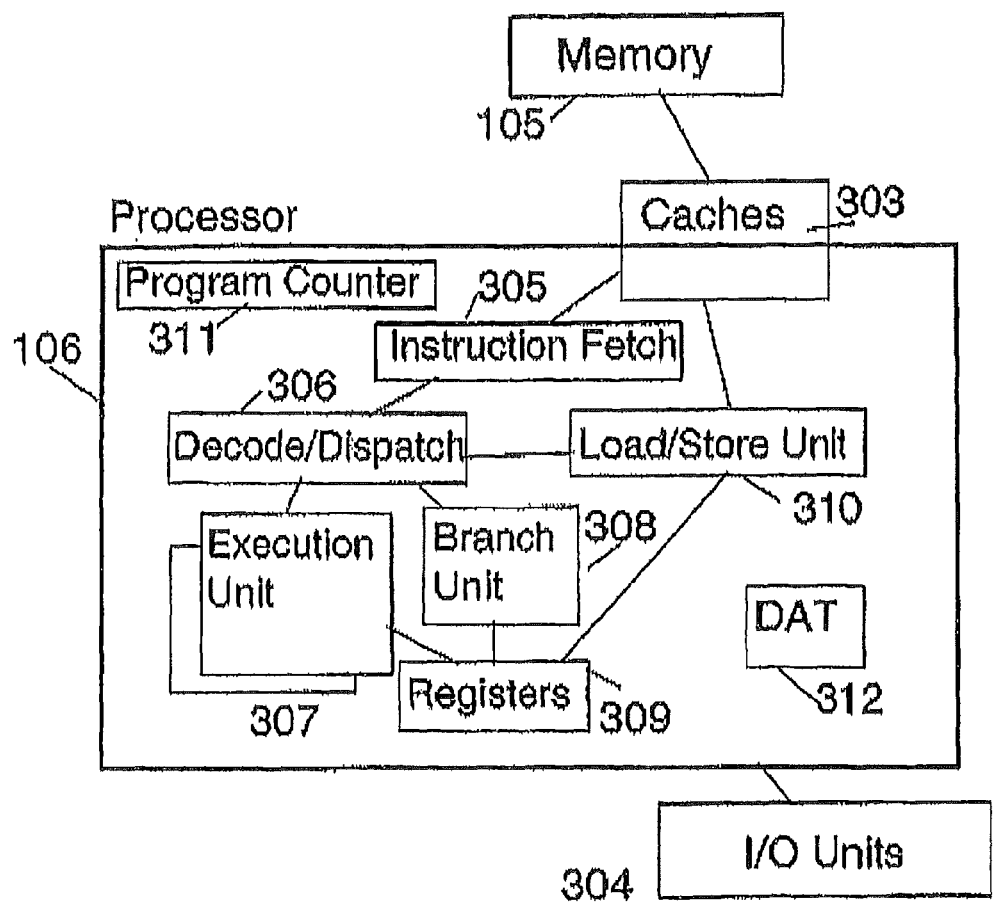
FIG. 3 is a diagram depicting elements of a computer system in an embodiment.

Referring to FIG. 3, an exemplary processor embodiment is depicted for processor 106. One or more levels of cache 303 are employed to buffer memory blocks in order to improve the performance of the processor 106. The cache 303 is a high speed buffer holding cache lines of memory data that are likely to be used. Typical cache lines are 64, 128 or 256 bytes of memory data. In an embodiment, separate caches are employed for caching instructions than for caching data. Cache coherence (synchronization of copies of lines in memory and the caches) is often provided by various "snoop" algorithms well known in the art. Main storage, such as memory 105 of a processor system is often referred to as a cache. In a processor system having 4 levels of cache 303 memory 105 is sometimes referred to as the level 5 (L5) cache since it is typically faster and only holds a portion of the non-volatile storage (DASD, Tape etc) that is available to a computer system. Memory 105 "caches" pages of data paged in and out of the memory 105 by the operating system.

A program counter (instruction counter) 311 keeps track of the address of the current instruction to be executed. A program counter in a z/Architecture processor is 64 bits and may be truncated to 31 or 24 bits to support prior addressing limits. A program counter is typically embodied in a program status word (PSW) of a computer such that it persists during context switching. Thus, a program in progress, having a program counter value, may be interrupted by, for example, the operating system (i.e., the current context switches from the program environment to the operating system environment). The PSW of the program maintains the program counter value while the program is not active, and the program counter (in the PSW) of the operating system is used while the operating system is executing. In an embodiment, the program counter is incremented by an amount equal to the number of bytes of the current instruction. Reduced Instruction Set Computing (RISC) instructions are typically fixed length while Complex Instruction Set Computing (CISC) instructions are typically variable length. Instructions of the IBM z/Architecture are CISC instructions having a length of 2, 4 or 6 bytes. The program counter 311 is modified by either a context switch operation or a branch taken operation of a branch instruction for example. In a context switch operation, the current program counter value is saved in the PSW along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 311.

In an embodiment, an instruction fetch unit 305 is employed to fetch instructions on behalf of the processor 106. The instruction fetch unit 305 either fetches the "next sequential instructions," the target instructions of branch taken instructions, or the first instructions of a program following a context switch. In an embodiment, the instruction fetch unit 305 employs prefetch techniques to speculatively prefetch instructions based on the likelihood that the prefetched instructions might be used. For example, the instruction fetch unit 305 may fetch 16 bytes of instructions that include the next sequential instruction and additional bytes of further sequential instructions.

The fetched instructions are then executed by the processor 106. In an embodiment, the fetched instruction(s) are passed to a decode/dispatch unit 306 of the instruction fetch unit 305. The decode/dispatch unit 306 decodes the instruction(s) and forwards information about the decoded instruction(s) to appropriate execution units 307, 308, and/or 310. An execution unit 307 receives information about decoded arithmetic instructions from the instruction fetch unit 305 and will perform arithmetic operations on operands according to the operation code (opcode) of the instruction. Operands are provided to the execution unit 307 either from the memory 105, architected registers 309, or from an immediate field of the instruction being executed. Results of the execution, when stored, are stored either in memory 105, architected registers 309 or in other machine hardware (such as control registers, PSW registers and the like).

Figure 4A:
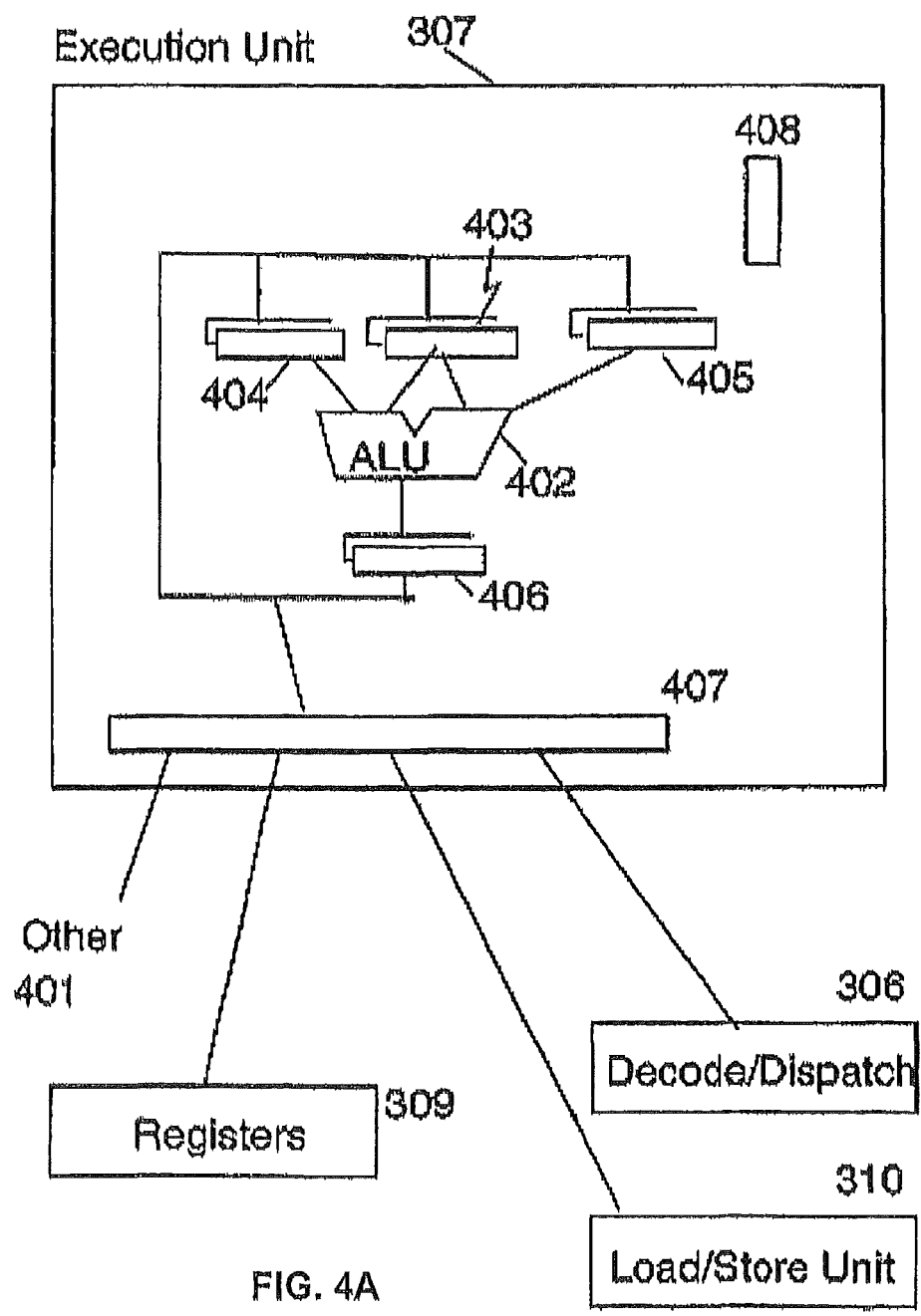
FIGS. 4A-4C depict detailed elements of a computer system in an embodiment.

A processor 106 typically has one or more execution units 307, 308, and 310 for executing the function of the instruction. Referring to FIG. 4A, an execution unit 307 may communicate with the architected registers 309, the decode/dispatch unit 306, the load/store unit 310 and other processor units 401 by way of interfacing logic 407. The execution unit 307 may employ several register circuits 403, 404, and 405 to hold information that the arithmetic logic unit (ALU) 402 will operate on. The ALU 402 performs arithmetic operations such as add, subtract, multiply and divide as well as logical function such as and, or and exclusive-or (xor), rotate and shift. In an embodiment, the ALU supports specialized operations that are design dependent. Other circuits may provide other architected facilities 408 including condition codes and recovery support logic for example. Typically the result of an ALU operation is held in an output register circuit 406 which can forward the result to a variety of other processing functions. In other embodiments, there are many arrangements of processor units, the present description is only intended to provide a representative understanding of one embodiment.

An ADD instruction for example would be executed in an execution unit 307 having arithmetic and logical functionality while a floating point instruction for example would be executed in a floating point execution unit (not shown) having specialized floating point capability. Preferably, an execution unit operates on operands identified by an instruction by performing an opcode defined function on the operands. For example, an ADD instruction may be executed by an execution unit 307 on operands found in two architected registers 309 identified by register fields of the instruction.

The execution unit 307 performs the arithmetic addition on two operands and stores the result in a third operand where the third operand may be a third register or one of the two source registers. The execution unit 307 preferably utilizes an arithmetic logic unit (ALU) 402 that is capable of performing a variety of logical functions such as shift, rotate, and, or and XOR as well as a variety of algebraic functions including any of add, subtract, multiply, divide. Some ALUs 402 are designed for scalar operations and some for floating point. In embodiments, data may be big endian (where the least significant byte is at the highest byte address) or little endian (where the least significant byte is at the lowest byte address) depending on architecture. The IBM z/Architecture is big endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 4B:
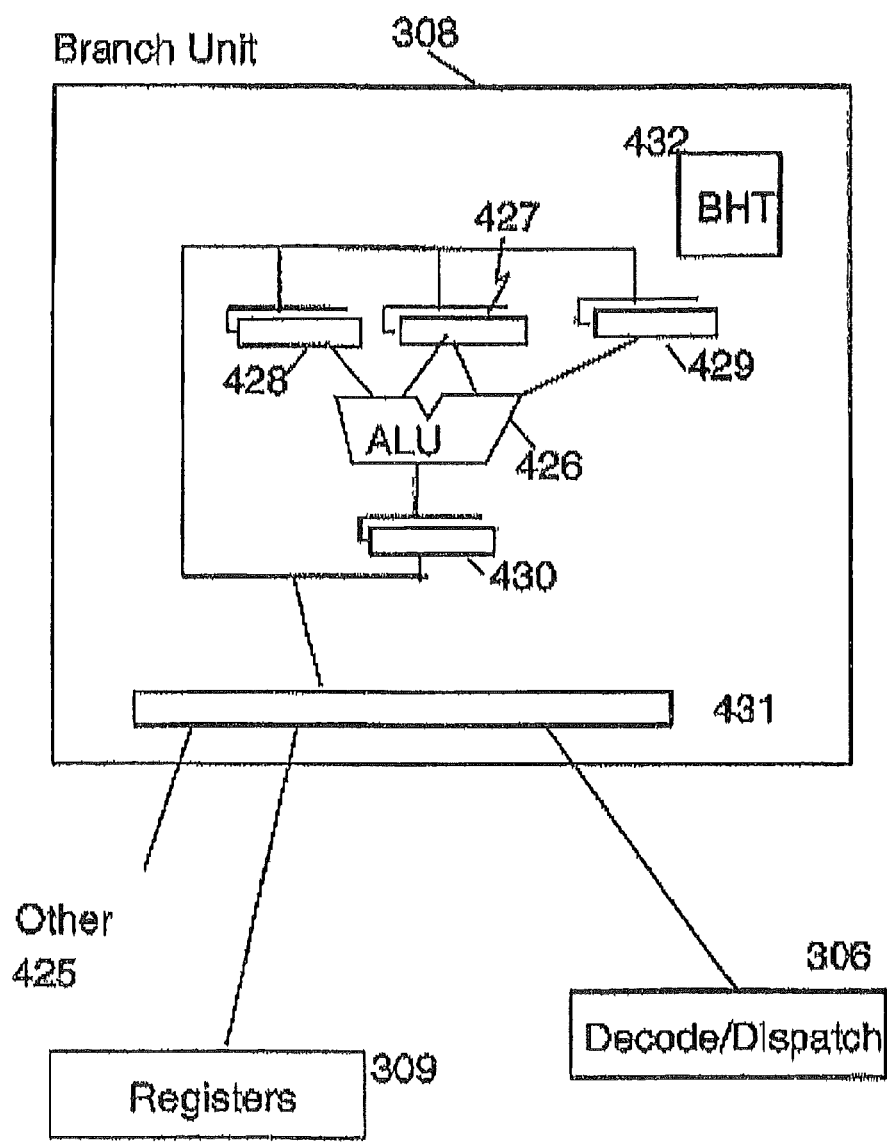

Referring to FIG. 4B, Branch instruction information for executing a branch instruction is typically sent to a branch unit 308 which employs a branch prediction algorithm such as a branch history table 432 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. In an embodiment, the branch unit 308 may employ an ALU 426 having a plurality of input register circuits 427, 428, and 429 and an output register circuit 430. The branch unit 308 may communicate with general registers, decode/dispatch unit 306 or other circuits 425 for example.

The execution of a group of instructions may be interrupted for a variety of reasons including a context switch initiated by an operating system, a program exception or error causing a context switch, an I/O interruption signal causing a context switch or multi-threading activity of a plurality of programs (in a multi-threaded environment) for example. In an embodiment, a context switch action saves state information about a currently executing program and then loads state information about another program being invoked. State information may be saved in hardware registers or in memory for example. State information includes a program counter value pointing to a next instruction to be executed, condition codes, memory translation information and architected register content. A context switch activity may be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory. Location herein implies a location in main memory (main storage) unless otherwise indicated.

Figure 4C:
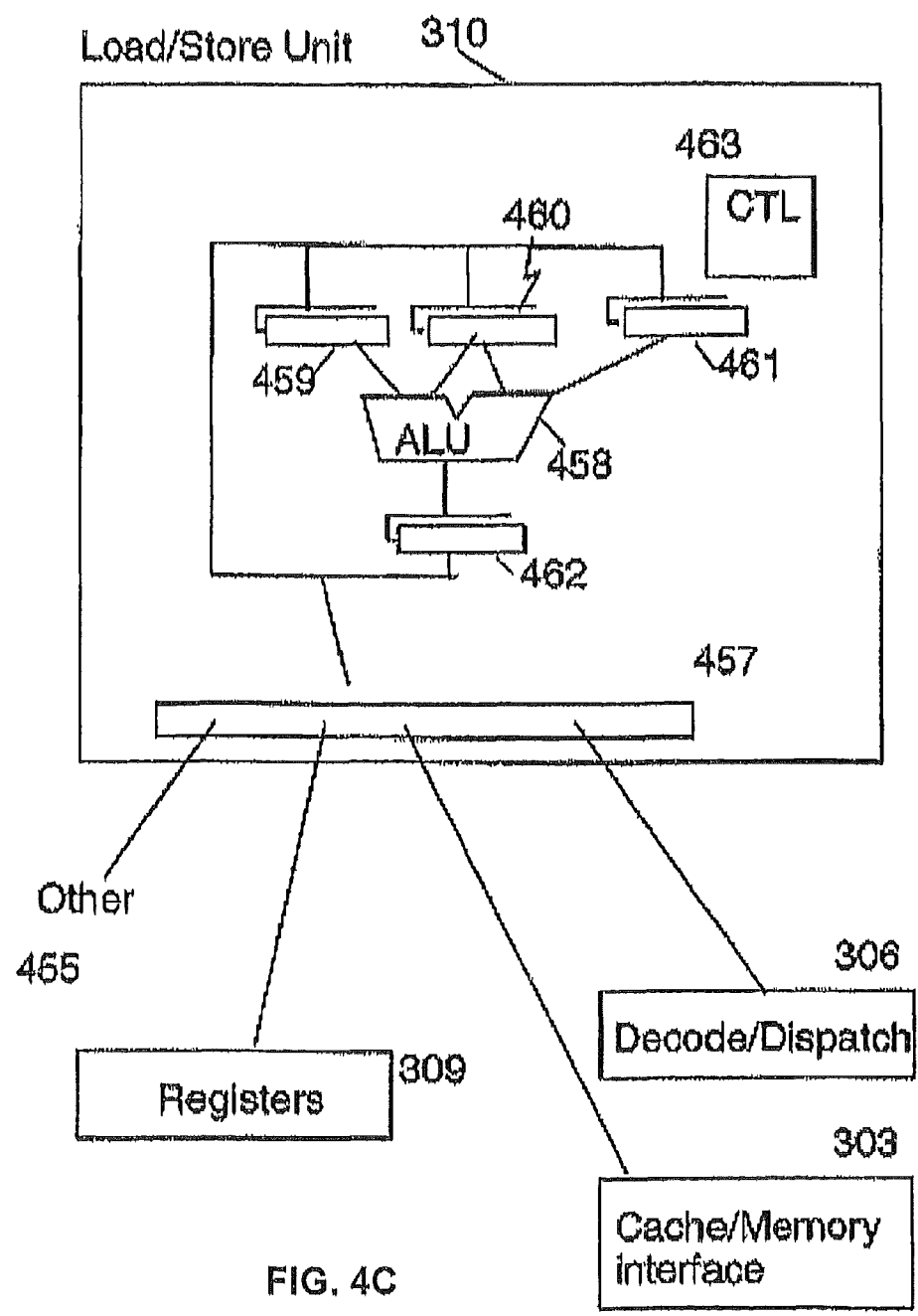

Referring to FIG. 4C, a processor accesses storage using a load/store unit 310. The load/store unit 310 may perform a load operation by obtaining the address of the target operand in memory through the cache/memory interface and loading the operand in an architected register 309 or another memory location, or may perform a store operation by obtaining the address of the target operand in memory and storing data obtained from an architected register 309 or another memory location in the target operand location in memory. The load/store unit 310 may be speculative and may access memory in a sequence that is out-of-order relative to the instruction sequence; however the load/store unit 310 maintains the appearance to programs that instructions were executed in order. A load/store unit 310 may communicate with architected registers 309, decode/dispatch unit 306, cache/memory interface or other elements 455 and comprises various register circuits, ALUs 458 and control logic 463 to calculate storage addresses and to provide pipeline sequencing to keep operations in-order. Some operations may be out of order but the load/store unit provides functionality to make the out of order operations appear to the program as having been performed in order as is well known in the art.

Preferably addresses that an application program "sees" are often referred to as virtual addresses. Virtual addresses are sometimes referred to as "logical addresses" and "effective addresses." These virtual addresses are virtual in that they are redirected to physical memory location by one of a variety of DAT technologies such as the DAT 312 of FIG. 3, including, but not limited to prefixing a virtual address with an offset value, translating the virtual address via one or more translation tables, the translation tables including at least a segment table and a page table alone or in combination, preferably, the segment table having an entry pointing to the page table. In z/Architecture, a hierarchy of translations is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential translation table accesses. The TLB content may be managed by a variety of replacement algorithms including least recently used (LRU).

In the case where the processor 106 is a processor of a multi-processor system, each processor has responsibility to keep shared resources such as I/O, caches, TLBs and Memory interlocked for coherency. In an embodiment, "snoop" technologies will be utilized in maintaining cache coherency. In a snoop environment, each cache line may be marked as being in any one of a shared state, an exclusive state, a changed state, an invalid state and the like in order to facilitate sharing.

The I/O units 304 of FIG. 3 provide the processor 106 with means for attaching to peripheral devices including tape, disc, printers, displays, and networks for example. The I/O units 304 are often presented to the computer program by software drivers. In mainframes such as the z/Series from IBM, channel adapters and open system adapters are I/O units of the mainframe that provide the communications between the operating system and peripheral devices.

Instrumentation data is data related to the operations of the processor 106. In an embodiment, access to instrumentation data and other system level metrics may be restricted, or unavailable. A computer processor operates under a privileged state (or supervisor state), and a lesser-privileged state (or problem state). In the privileged state, a program may have access to all system resources via privileged operations (e.g., access to all control registers and the supervisor memory space). The privileged state is also referred to as privileged mode or supervisor mode. An operating system executing on the computer processor may be operating in the privileged state. The lesser-privileged state is a non-privileged state where access to system resources is limited. For example, application programs running in lesser-privileged state may have limited or no access to control registers and may access only user memory space assigned to the application program by the operating system. The lesser-privileged state is typically assigned to application programs executed under control of an operating system, and no privileged operations can be performed in the lesser-privileged state. The lesser-privileged state is also known as a problem state, problem mode or user mode.

One such restricted resource that is not write accessible to a program executing in the lesser-privileged state is the program status word (PSW). The PSW may comprise a program counter of the next instruction to be executed, a condition code field usable by branch instructions, an instrumentation control field for indicating whether instrumentation is enabled or disabled, and other information used to control instruction sequencing and to determine the state of the computer processor including the privilege state assigned to the program. In a multithreaded processing environment, multiple programs share, or time slice, the available computer processor capacity. Each of the programs has context information including an associated PSW, an origin address of an address translation table for accessing main storage assigned to the program, a set of general purpose register current values, control registers, floating point registers, etc. The currently active, or controlling PSW, is called the current PSW. It governs the program currently being executed. The computer processor has an interruption capability, which permits the computer processor to context switch rapidly to another program in response to exception conditions and external stimuli. When an interruption occurs, the computer processor places the current PSW in an assigned storage location, called the old-PSW location, for the particular class of interruption. The computer processor fetches a new PSW from a second assigned storage location. This new context determines the next program to be executed. In an embodiment, these storage locations are located in a memory location accessible to the computer processor. When the computer processor has finished processing the interruption, the program handling the interruption may reload the old context including the old PSW, making it again the current PSW, so that the interrupted program can continue.

The fields of the PSW may be referenced either explicitly (e.g., when instruction execution reads part of the PSW bits), or implicitly (e.g., in instructions fetching, operand fetching, address generation calculations, address generation sources, etc.). The explicit reference is generally performed at execution time, whereas the implicit reference is generally performed at different stages of the pipeline during instruction execution (i.e., instruction fetch, instruction decode, execution time and completion time). Individual fields in the PSW may be referenced or updated independently of each other.

In an embodiment, by manipulating the context, an operating system controls computer processing resources, including enabling run-time-instrumentation by the computer processor. The run-time-instrumentation may be enabled or disabled during the execution of the operating system, as well as by any software applications executed by the operating system. The enabled/disabled state of run-time-instrumentation is saved as context information in the PSW associated with a program.

A run-time-instrumentation (RI) facility may be incorporated on models implementing z/Architecture. When the RI facility is installed and enabled, data is collected during program execution into one or more collection buffers within the CPU and then reported to a program buffer. Each unit of information stored is called a reporting group. The contents of a reporting group consist of multiple records whose contents represent events recognized by the CPU during program execution.

When the run-time-instrumentation facility is installed in a configuration, a PSW field (RI bit) enables run-time-instrumentation. Validity of the run-time-instrumentation controls determines the capability of turning on the RI bit, but when RI is one, the CPU controls are valid and run-time-instrumentation is enabled. The run-time-instrumentation facility may include the following instructions: load run-time-instrumentation controls, modify run-time-instrumentation controls, run-time-instrumentation emit, run-time-instrumentation next, run-time-instrumentation off, run-time-instrumentation on, store run-time-instrumentation controls, and test run-time-instrumentation controls.

The load run-time-instrumentation controls (LRIC) instruction initializes the run-time-instrumentation controls that govern run-time-instrumentation. The modify run-time-instrumentation controls (MRIC) instruction modifies all or a subset of the run-time-instrumentation controls originally established by LRIC. The run-time-instrumentation emit (RIEMIT) instruction collects the value of a general register by storing it into a collection buffer. The run-time-instrumentation next (RINEXT) instruction performs directed sampling of the next, sequential instruction (NSI) after RINEXT. The run-time-instrumentation off (RIOFF) instruction disables run-time-instrumentation. The run-time-instrumentation on (RION) instruction enables run-time-instrumentation. The store run-time-instrumentation controls (STRIC) instruction places the current values of the run-time-instrumentation controls into a specified storage location. The test run-time-instrumentation controls (TRIC)

instruction examines the run-time-instrumentation controls. If valid, the state of a controls-altered indicator is set.

The run-time-instrumentation facility includes the ability for making a measurement-alert external interruption pending. Some of the information collected by run-time-instrumentation and reported to a program buffer is model-dependent and thus not defined. Samples and data provided by the run-time-instrumentation facility are intended for statistical estimation of performance characteristics, are substantially accurate, and may not be repeatable. For example, regardless of sampling mode, it is unpredictable if a sample instruction that caused an exception or is associated with certain system internal activities would result in the store of a reporting group and, if stored, whether the model-dependent data included in run-time-instrumentation data is affected.

A collection buffer is used to capture a set of records whose contents report on events recognized by the processor during program execution. Examples are: execution of one or more taken branches, transactional-execution abort events, instruction-fetch cache misses, data fetch or store cache misses, and an operand of the RIEMIT instruction. Execution of the RIEMIT instruction collects the value of a general register by storing it into the collection buffer. Additional data can be collected and/or stored in other buffers, such as an instruction-data buffer.

Reporting is subject to reporting controls. When a sample instruction is identified, each reporting control enables the checking of a corresponding condition. If a corresponding condition exists, a reporting group is formed and stored. A reporting group is not stored when no reporting control is enabled or the corresponding condition does not exist for an enabled reporting control. Data reported about a sample instruction may be acquired from the instruction-data buffer and other model-dependent sources, and then used to create the contents of one or more records of the reporting group, one such record being an instruction record.

Record types that may be captured in the reporting group store include: filler, extra, begin, timestamp, instruction, emit, TX abort, call, return, and transfer. A filler record is used in a reporting group when the number of valid records in the collection buffer is not sufficient to fill a reporting group of the current reporting-group size. An extra record may be used in the extra section of a reporting group. A begin record is the first record of the first reporting group. A timestamp record is stored as record 0 of every reporting group other than the first reporting group. An instruction record is created when a reporting group is stored for a sample instruction as the last record of the reporting group. An emit record is created by successful execution of RIEMIT. A transaction-execution (TX) mode abort record is created by either an implicit abort or by execution of a transaction abort instruction. A call record is created by execution of a branch instruction which is categorized as a call-type branch instruction. A return record is created by execution of a return-type branch instruction which is categorized as a return instruction. A transfer record is created by execution of a branch instruction which meets certain condition code criteria.

Figure 5:
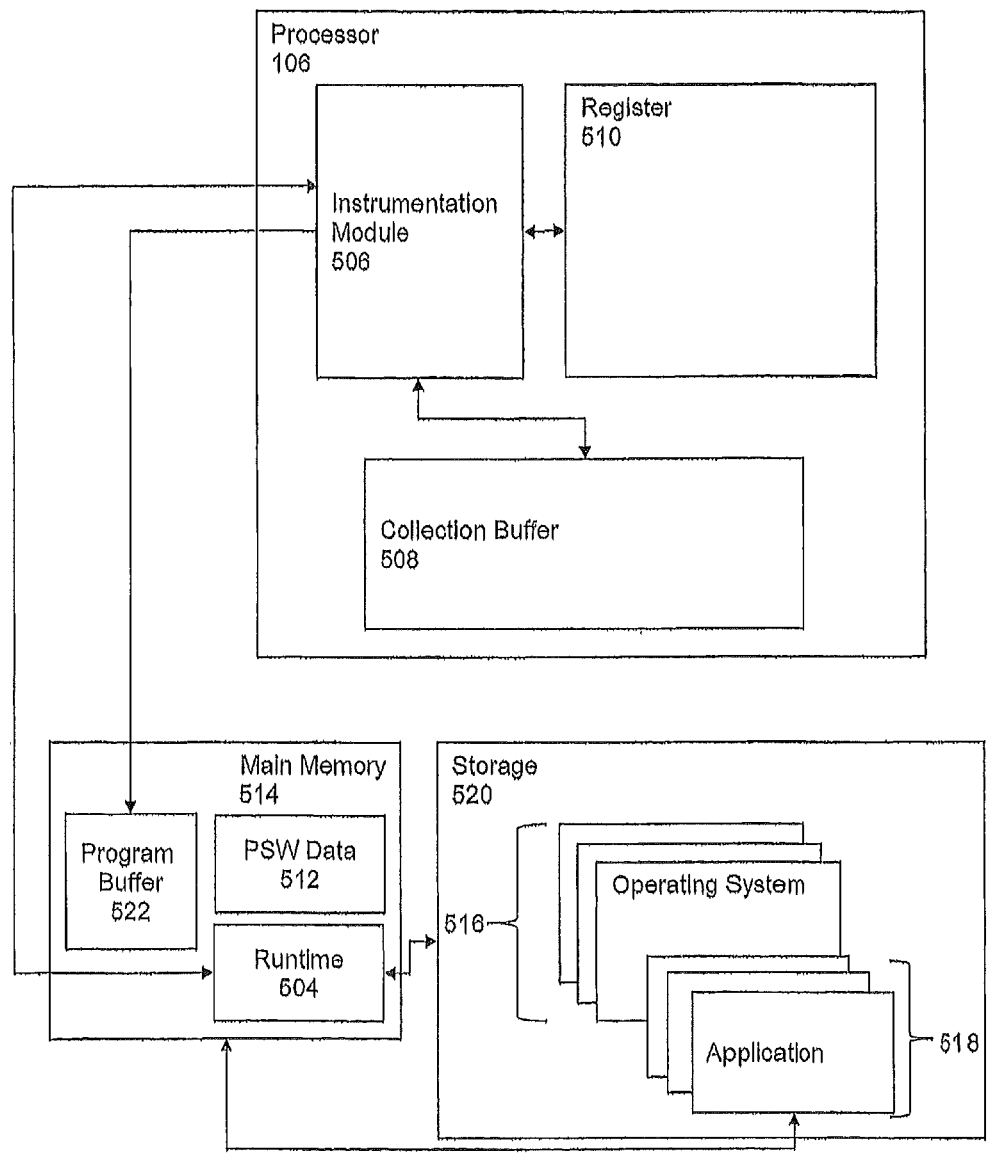
FIG. 5 depicts a schematic diagram of a system for run-time instrumentation of a processor in accordance with an embodiment.

FIG. 5 depicts a schematic diagram of a system for run-time-instrumentation of a processor that may be implemented in an embodiment. In an embodiment, the system 500 includes a central processing unit (CPU) such as the processor 106 of FIG. 1. In an embodiment, the processor 106 is a single processor. In an alternate embodiment, the processor 106 is a single processing core of a multi-core processor. In an embodiment, the processor 106 is capable of operating at varying speeds.

In an embodiment, the processor 106 further includes a register 510. The register 510 is a hardware register capable of storing words of data for use by the processor 106. The register 510 includes one or more latches for storing bits of data that are accessible by the processor 106. The register 510 may include general purpose registers and control registers for example. The processor 106 additionally includes an instrumentation module 506 that is in communication with the register 510. The instrumentation module 506 is a processing circuit that controls the instrumentation of the processor 106. The instrumentation module 506 is configured to collect instrumentation data, such as the execution path of one or more taken branches, transactional execution abort events, various runtime operands, timestamp information, etc. directly from the processor 106. The instrumentation module 506 collects the instrumentation data from the processor 106, and stores the instrumentation data in a collection buffer 508. In an embodiment, the collection buffer 508 is a circular buffer that collects data received from the instrumentation module 506, and when the circular buffer is filled it overwrites the oldest data with new data.

The processor 106 executes one or more operating systems 516 and one or more applications 518. The one or more operating systems 516 and one or more applications 518 are stored in a storage 520, such as a hard drive, CD/ROM, flash memory, etc. and are loaded into a main memory 514 in a runtime memory 504 area reserved for storing one or more active pieces of the currently executing operating system and/or application, called pages, which are loaded from the storage 520 into runtime memory 504 as needed. In an embodiment, each of the operating systems execute as a virtual machine managed by a hypervisor (not shown) and executed by the processor 106.

In an embodiment the processor 106 loads a PSW 512 in the register 510 from PSW data 512 in the main memory 514 for the currently executing operating system or application from the main memory 514 and sets one or more processor settings in, for example, the register 510. In an embodiment, the PSW in the register 510, includes one or more bits for enabling and controlling the instrumentation module 506.

The one or more applications 518 include software applications compiled to execute on a specific operating system, interpreted code executing on an interpreter (e.g., Java), or operating system support threads (e.g., process management, daemons, etc.). Each of the one or more operating systems 516 and or the one or more applications 518 may execute an instruction to trigger the instrumentation module 506 to start, or to stop, the collecting instrumentation data.

In an embodiment, one of the one or more applications 518 executes an instruction that has been determined to be a sample instruction, thereby creating a sample point at the completion of execution of the sample instruction and that then causes the instrumentation module 506 to move the application's collected data from the collection buffer 508, to a program buffer 522 in main memory 514 that is accessible to the application. The main memory 514 may be any addressable memory known in the art. In an embodiment, the main memory 514 may include a fast-access buffer storage, sometimes called a cache. Each CPU may have an associated cache. In an additional embodiment, the main memory 514 is dynamic random access memory (DRAM).

In a yet another embodiment, the main memory is a storage device, such as a computer hard drive, or flash memory accessible by an application.

To configure run-time instrumentation controls, the processor 106 supports a load run-time instrumentation controls (LRIC) instruction. Beyond the specific LRIC fields described further herein, it will be understood that additional fields can be defined to support other functionality. The LRIC instruction can be used to load and initially configure run-time instrumentation and is supported by instrumentation module 506 of FIG. 5. In an embodiment, the instrumentation module 506, also referred to as run-time instrumentation module 506, implements run-time-instrumentation controls and reporting controls. A current state of run-time instrumentation controls can be stored from register 510 of FIG. 5 into main memory 514 using the store run-time controls (STRIC) instruction. The definition of various fields of a control block loadable as an operand of the LRIC instruction is also used herein to refer to the state of corresponding values of the run-time-instrumentation controls.

Figure 6:
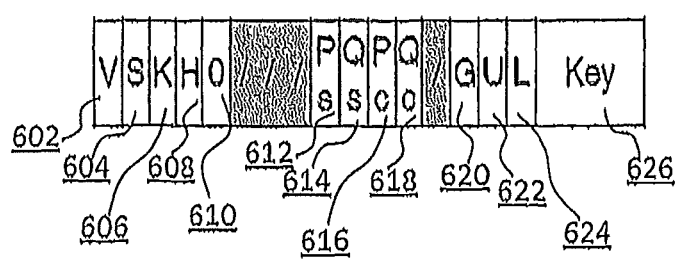
FIG. 6 depicts a portion of a run-time-instrumentation control block (RICCB) including controls that are settable by a privileged state in an embodiment.

FIG. 6 depicts a portion of a run-time-instrumentation controls control block (RICCB) including controls that are settable by a privileged state in an embodiment. The control block portion 600 may include additional values other than those described in reference to FIG. 6. Modification to the control block portion 600 may be performed by an LRIC instruction.

The control block portion includes a validity bit 602 (V bit). The validity bit 602 indicates the validity of the set of run-time-instrumentation controls in the processor, as they were previously set by an LRIC instruction.

The control block also includes an S bit 604, which is used to determine if the lesser-privileged state program is allowed to execute an MRIC instruction. The K bit 606 indicates if the lesser-privileged state program is permitted to execute in a semi-privileged state with regard to the run-time-instrumentation controls, such as the origin address, and the limit address of the run-time-instrumentation controls. The H bit 608 determines whether the address controls (i.e., the origin address, limit address, and current address) refer to a primary virtual address space or a home virtual address space. The 0 bit 610 is ignored and treated as a 0.

A lesser-privileged state sample reporting control bit 612 (Ps bit) is used in conjunction with lesser-privileged state programs. When in the lesser-privileged state and the Ps bit 612 in the run-time-instrumentation controls is zero, the reporting controls of the run-time-instrumentation controls are ignored when run-time-instrumentation is enabled, and thus do not cause a reporting group to be stored. When in the lesser-privileged state and the Ps bit 612 in the run-time-instrumentation controls is one, the reporting controls are checked and used according to their defined function.

A supervisor-state sample reporting control bit 614 (Qs bit) is used in conjunction with supervisor-state programs. When in the supervisor state and the Qs bit 614 in the run-time-instrumentation controls is zero, the reporting controls of the run-time-instrumentation controls are ignored when run-time-instrumentation is enabled, and thus do not cause a reporting group to be stored. When in the supervisor state and the Qs bit 614 in the run-time-instrumentation controls is one, the reporting controls are checked and used according to their defined function.

The lesser-privileged state collection buffer control bit 616 (Pc bit) controls updates to the collection buffer 508 of FIG. 5. When in lesser-privileged state and the Pc bit 616 in the run-time-instrumentation controls is zero, collection buffer controls of the run-time-instrumentation controls are ignored when run-time-instrumentation is enabled and updates of the collection buffer 508 are prevented. When in the lesser-privileged state and the Pc bit 616 in the run-time-instrumentation controls is one, the collection buffer controls are checked and used according to their defined function.

The supervisor-state collection buffer control bit 618 (Qc bit) controls updates to the collection buffer 508. When in supervisor state and the Qc bit 618 in the run-time-instrumentation controls is zero, collection buffer controls of the run-time-instrumentation controls are ignored when run-time-instrumentation is enabled and the updates to the collection buffer 508 are prevented. When in supervisor state and the Qc bit 618 in the run-time-instrumentation controls is one, the indicated collection-buffer controls are checked and used according to their defined function.

The G bit 620 is the pending control of a run-time-instrumentation-halted interruption, also called a halted interruption. When the G bit 620 is zero, a halted interruption is not pending. When the G bit 602 is one, a halted interruption is pending. When the first reporting group in a program buffer 522 is written, the G bit 620 is set to zero. That is, when run-time-instrumentation program-buffer origin address (ROA) 702 equals a run-time-instrumentation program buffer current address (RCA) 706 of FIG. 7, the G bit 620 is set to zero. When an attempt to store other than the first reporting group in program buffer 522 is made, the G bit 620 is set to zero if the run-time-instrumentation-halted condition does not exist, and the reporting group is stored. When an attempt to store other than the first reporting group in program buffer 522 is made, the G bit 620 is set to one if the run-time-instrumentation-halted condition does exist, and the reporting group is not stored.

The U bit 622 is the enablement control for a buffer-full interruption and a halted interruption. When U bit 622 is zero, generation of an interruption request is disabled and, if pending, remains pending.

The L bit 624 is the pending control of a buffer-full interruption. When L bit 624 is zero, a buffer-full interruption is not pending. When L bit 624 is one, a buffer-full interruption is pending.

The key field 626 is a 4-bit unsigned integer whose value is used as a storage-protect key for the store of a reporting group. A store of a reporting group is permitted only when the storage key matches the access key associated with the request for storage access, and a fetch is permitted when the storage key matches the access key or when a fetch-protection bit of the storage key is zero. The keys match when the four access control bits of the storage key are equal to the access key, or when the access key is zero.

Figure 7:
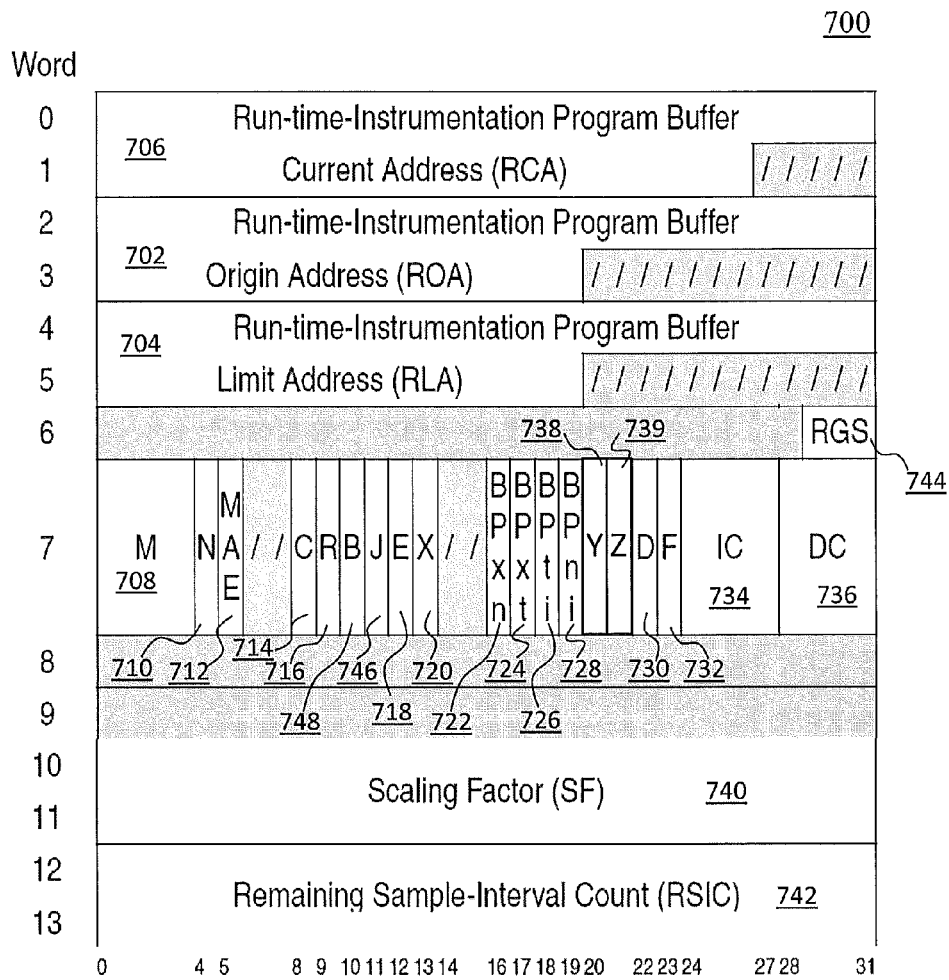
FIG. 7 depicts a portion of a RICCB control block when the semi-privileged bit (K) is set to 1 in an embodiment.

FIG. 7 depicts a portion of a RICCB control block when MRIC is permitted to execute in semi-privileged mode (i.e., K bit is one). The control block 700 can also be an operand of an LRIC instruction for initialization of run-time-instrumentation controls. The control block 700 may include additional values other than those described in reference to FIG. 7. In an embodiment, sections of the MRIC instruction operand that are not otherwise designated are inaccessible by a lesser-privileged state program. When the semi-privileged mode is permitted, a 3run-time-instrumentation program-buffer origin address (ROA) 702 and a run-time-instrumentation program-buffer limit address (RLA) 704 are set with the MRIC instruction by the lesser-privileged state program. The ROA 702 is the location of the first byte of the program buffer 522 of FIG. 5. The RLA 704 indicates the location of the last byte of the program buffer 522.

In an embodiment, a run-time-instrumentation program buffer current address (RCA) 706 may be updated by the MRIC instruction. The RCA 706 is the location in the program buffer 522 of a next reporting group to be stored. The RCA 706 examines the reporting group size field 744 (RGS field) and affects the number of significant bit positions used to form the address of the program buffer 522. The 64-bit RCA 706 is word 0, bit positions 0 through 26-RGS of word 1, and RGS+5 binary zeros appended on the right. This is the starting location in the program buffer 522 of FIG. 5 of a subsequent reporting group that will be stored in the program buffer 522. The reporting group is a unit of information that is created by the instrumentation module 506, and subsequently stored in the program buffer 522. In an embodiment, when the RGS field 744 specified by the RCA 706 is not equal to the run-time-instrumentation control's current reporting group size (i.e., the RCA 706 would change the RGS field 744) then the RCA 706 is set to the ROA 702.

A remaining sample interval count field 742 (RSIC field) may be updated by the lesser-privileged program using the MRIC instruction. The RSIC field 742 includes a 64-bit unsigned integer that indicates a remaining sample interval count. When the value of the RSIC field 742 in the run-time-instrumentation controls is zero or equal to the value in a scaling factor field 740 (SF field), and run-time-instrumentation is enabled, then the next sample interval is a full interval based on the sampling mode 708 (M) and SF field 740 values. When RSIC field 742 is nonzero and less than the SF field 740 and run-time-instrumentation is enabled, the next sample interval is a partial interval. When the RSIC field 742 is nonzero and greater than the SF field 740 value and run-time-instrumentation is enabled, the next sample interval is an extended interval. When an extended interval expires, the next interval is based on the SF field 740 value. When the RSIC field 742 is set to a nonzero value, it is subject to the same model-dependent maximum limit to which the SF field 740 is also subject. When the original value of the RSIC field 742 is zero, the sampling mode will dictate whether the RSIC field 742 is set to the value in the SF field 740 during execution of LRIC and MRIC instructions, or whether it continues to show as zero until run-time-instrumentation is enabled.

The SF field 740 contains a 64-bit unsigned integer whose value is a scaling factor count of units. The dimension of the units is determined from the mode field 708 (M field). When the value in the RSIC field 742 is zero, the SF field 740 provides an initial value of the RSIC field 742 that is decremented to zero at which point the current instruction is recognized as a sample instruction, and the interval count is refreshed from the SF field 740 value. A valid value of the SF field 740 is in the range one to $2^{64}-1$. If zero is specified, a value of one is assumed. However, each model may have both a minimum and a maximum value of the SF field 740. The minimum and maximum values may also be different based on the mode field 708. If a value less than the minimum is specified, the model-dependent minimum value is loaded. If a value greater than the maximum value is specified, the model-dependent maximum value is loaded.

The DC control field 736 is a 4-bit unsigned integer whose value designates a cache-latency level associated with a data fetch or store cache miss. That is, the sample instruction encountered a data access cache miss. Unless prohibited by another run-time-instrumentation control, an attempt is made to store a reporting group representing the sample instruction whose data access recognized a miss at a cache-latency level numerically greater than or equal to the level designated by the value of the DC control field 736. The cache structure and cache-latency level for data access is model dependent. For an instruction with multiple or long operands, it is model dependent which, if any, operand access is used for reporting control. Model-dependent behavior may ignore the value of the DC control field 736 and thus not use it as a reason to store a reporting group.

The IC field 734 is a 4-bit unsigned integer whose value designates a cache-latency level associated with an instruction-fetch cache miss. That is, the fetch of the sample instruction encountered an instruction-fetch cache miss. For both the IC field 734 and DC control field 736, a cache-latency level is an abstraction of how far a certain cache level access is from the observing processor. The latency level depends on the combination of the amount of nested cache levels between the processor and main storage, and how such cache levels are shared among multiple processors. A larger latency level generally corresponds to a more time-consuming access. Values in the IC field 734 and DC control field 736 may be thought of as zero-origin identification of a cache-latency level. For example, a value of zero corresponds to an L1 cache (i.e., the cache that is closest to the processor). A value of one is therefore the next layer of cache which may be known as an L2 cache, or even an L1.5 cache in some machines. Values of 2-15 designate the logical progression of additional cache-latency layers until main memory is reached, but not including main memory itself. Generally, cache structures do not go as deep as fifteen layers. Therefore, a value of 15 in the IC field 734 and DC control field 736 is interpreted as a special case, meaning that a cache miss on instruction fetch or data access, respectively and regardless of cache-latency level, is not recognized for the purpose of generating the store of a reporting group. Unless prohibited by another run-time-instrumentation control, an attempt is made to store a reporting group representing the sample instruction whose fetch recognized a miss at a cache-latency level numerically greater than or equal to the level designated by the value of the IC field 734. The cache structure and cache-latency level for instruction fetching is model dependent. Model-dependent behavior may ignore the value of the IC field 734 and thus not use it as a reason to store a reporting group.

The cache-latency-level-override reporting control bit 732 (F bit) is for non-branch instructions and for branch-prediction controls. When the F bit 732 in the run-time-instrumentation controls is zero, the cache-reporting controls (IC field 734 and DC control field 736) of the run-time-instrumentation controls are checked and used according to their defined function. The branch-prediction controls (BPxn 722, BPxt 724, BPti 726, and BPni 728 bits) of the run-time-instrumentation controls are checked and used according to their defined function. When the F bit 732 is one, these same controls are ignored and a reporting group is stored unless prohibited by another control.

The data-cache-miss control bit 730 (D bit) indicates if a reporting group is to be stored. If the D bit 730 is one, an extra type record may or may not be placed in the extra section of the reporting group which contains model dependent data about the sample instruction.

The MRIC instruction includes branch-prediction (BP) reporting controls (BPxn 722, BPxt 724, BPti 726, and BPni 728). If a BP reporting control bit in the run-time-instrumentation controls is zero, the corresponding condition is not checked. If a BP reporting-control bit is one and the corresponding branch-prediction condition exists, and a reporting group is stored.

The BPxn bit 722, when one, enables checking of branch-prediction information. Thus, if the sample branch is incorrectly predicted to be taken but is not taken, a reporting group is stored.

The BPxt bit 724, when one, enables checking of the branch-prediction information. Thus, if the sample branch is incorrectly predicted to be not taken but is taken, a reporting group is stored.

The BPti bit 726, when one, enables checking of the branch-prediction information. Thus, if the sample branch is correctly predicted to be taken, and is taken, but the branch target is incorrectly predicted, a reporting group is stored.

The BPni bit 728, when one, enables checking of the branch-prediction information. Thus, if the sample branch is correctly predicted to not be taken, and is not taken, and the branch target is incorrectly predicted, a reporting group is stored.

The enablement control of transactional-execution-mode records bit 720 (X bit) controls the collection of transactional-execution-mode abort records. When the X bit 720 in the run-time-instrumentation controls is zero, transactional-execution-mode abort records are not collected. When the X bit 720 is one, transactional-execution mode abort records are collected and placed in the collection buffer 508 of FIG. 5. If a model does not have a transactional-execution facility installed, the X bit 720 is ignored.

The RIEMIT instruction control bit 718 (E bit) controls the execution of the RIEMIT instruction. When the E bit 718 in the run-time-instrumentation controls is zero or ignored and treated as zero when run-time-instrumentation is enabled, RIEMIT executes a no-operation. When E bit 718 is one, and not otherwise ignored, RIEMIT is enabled to execute its defined function.

The J bit 746 when zero, specifies that the branch on condition (BC) instruction is in the other-type branch category, regardless of mask value. If the J bit 746 is one, the BC instruction which specifies a mask of 15 is in the return-type branch category. When the BC instruction specifies a mask of 1-14, it is not affected by the J bit 746 and is always in the other type branch category. When in the return-type branch category, the R bit 716 controls inclusion into the collection buffer 508 of FIG. 5. When in the other type branch category, the B bit 748 controls inclusion into the collection buffer 508. The other-type branch category may also be indicated as the transfer-type branch category.

The instruction address code bit 714 (C bit) controls the enablement of call type branches. If the C bit 714 in the run-time-instrumentation controls is one and the instruction is a call-type branch, the collection buffer 508 is updated. If model-dependent detection of both call-type and return-type branches is combined, the C bit 714 operates on both types and the R bit 716 is not effective.

The R bit 716 is the enablement control of return-type branches. If the R bit 716 in the run-time-instrumentation controls is one and the instruction is a return-type branch, then the collection buffer 508 is updated.

The B bit 748 is the enablement control of branches other than call-type and return-type branches. If the B bit 748 in the run-time-instrumentation controls is one and the instruction is an other-type branch recognized by run-time-instrumentation, then the collection buffer 508 is updated.

The maximum-address exceeded bit 712 (MAE bit), if set to 1, indicates that, one or more reporting groups have been stored that have the C bit 714 set to one. Once the MAE bit 712 is set to one, continuing execution of run-time-instrumentation does not set it back to zero. Execution of the LRIC instruction or the MRIC instruction which specifies the MAE bit 712 as zero will set the MAE bit 712 to zero.

The run-time-instrumentation next (RINEXT) control bit 710 (N bit) controls the enablement of the run-time-instrumentation next instruction, which controls the execution of a sample instruction. When the N bit 710 in the run-time-instrumentation controls is zero or ignored and treated as zero, RINEXT executes a no-operation. When the N bit 710 is one, and not otherwise ignored, RINEXT is enabled to execute its defined function.

The mode field 708 (M field) is a 4-bit unsigned integer whose value in the run-time-instrumentation controls specifies the sampling mode for the run-time-instrumentation controls. Supported sampling modes, may include sampling based on counting CPU cycles, counting instructions, or be directed to sample in response to a sample instruction, such as RINEXT.

The reporting group size field 744 (RGS) is a 3-bit unsigned integer whose value specifies the number of records of a reporting group ($R_{RG}$). The number of records in a reporting group may vary from two records, including a begin/timestamp record and an instruction last record, up to two hundred fifty-six records. In an embodiment, the upper limit may be model dependent. The number of 16-byte records placed into a reporting group is $2^{(RGS+1)}$.

The primary-CPU capability suppression control bit 738 (Y bit) and the secondary-CPU capability suppression control bit 739 (Z bit) are collectively referred to as the suppression control. Suppression of the storing of a reporting group means that an attempt to store is not performed. The suppression control is not effective and no suppression occurs when the CPU capability of all CPUs in the configuration is the same. In a configuration, if the CPU capability of a CPU differs from the capability of another CPU, the suppression control is in effect, and at least one CPU is said to be operating at the CPU capability or primary-CPU capability while at least one other CPU is said to be operating at the secondary-CPU capability. The primary and secondary CPU capabilities are different operating speeds. When Y bit 738 and Z bit 739 are both zero, suppression does not occur. When Y bit 738 is zero and Z bit 739 is one, suppression occurs if the CPU, e.g., processor 106, is operating at the secondary-CPU capability. When Y bit 738 is one and Z bit 739 is zero, suppression occurs if the CPU, e.g., processor 106, is operating at the primary-CPU capability. When Y bit 738 and Z bit 739 are both one, suppression occurs.

The above fields and bits of FIG. 7 are an example of the placement and naming of the fields and are provided herein for purposes of clarity. It will be understood that in other embodiments the only a subset of the fields may be used, fields may be in any order or position, and/or may be signified by different names.

When run-time instrumentation is installed and enabled, a number of events and data can be captured in collection buffer 508. The collection buffer 508 is used to capture a set of records whose contents report on events recognized by the processor 106 during program execution. Examples are: execution of one or more taken branches, transactional-execution abort events, cache-misses, and an operand of a run-time instrumentation emit instruction. The IC and DC controls fields 734 and 736 set a level at which the program would be interested in taking some corrective action to improve instruction or data pre-fetch behavior. Execution of the RIEMIT instruction collects the value of a general register by storing it into the collection buffer 508. Additional data can be collected and/or stored in other buffers, such as an instruction-data buffer (IDB) (not depicted) used to collect model-dependent sample-instruction data to construct a run-time-instrumentation instruction record.

Collected run-time-instrumentation information is reported on a sampling basis. Instructions from the instruction stream are sampled. The instruction that is sampled is called the sample instruction. A number of modes for determining a sample instruction are defined as follows when run-time instrumentation is enabled. In cycle-count mode, a count is the number of CPU cycles specified in either SF 740 or RSIC 742, whichever is used to provide the count for the current interval. The count is adjusted responsive to an event associated with the sampling mode. For example, the count may be decremented when the processor 106 is in the operating state. When the count is decremented to threshold value, such as zero, the current instruction is recognized as a sample instruction, and the count is reinitialized to the SF 740 value and begins to be decremented with the next cycle. When execution of the sample instruction completes, reporting is performed, if appropriate.

In instruction-count mode, a count is specified in either SF 740 or RSIC 742, whichever is used to provide the count for the current interval. For an instruction which consists of a single unit of operation, the count is decremented at the completion of the instruction as an event used to adjust the count. The instruction is a sample instruction when the count is decremented to a threshold value, such as zero. For an instruction which consists of multiple units-of-operation, the count may be decremented in one of the following ways:
a. For an interruptible instruction, all units of operation through partial completion represent one counted unit for which the count is decremented.
b. For an interruptible instruction, all units of operation since the most-recent partial completion through final completion represent one counted unit for which the count is decremented.
c. For an instruction that completes after performing a CPU-determined subportion of the processing specified by the parameters of the instruction, the completion represents one counted unit for which the count is decremented.
d. For an instruction that completes after performing multiple units of operation but not in categories a-c above, completion of the last unit of operation represents one counted unit for which the count is decremented.

An instruction is a sample instruction when the count is decremented to zero for any counted unit of the instruction. When a threshold value is reached, such as zero, the count is reinitialized to the SF 740 value and begins to count down as described in a-d above. In all cases of the count modes, reporting, if appropriate, occurs after completion of the last unit of operation of the sample instruction.

In directed-sampling mode, directed sampling occurs when the N-bit 710 is one and the RINEXT instruction is executed successfully. The sample instruction is the next, sequential instruction (NSI) after the RINEXT instruction. If the next, sequential instruction is an execute-type instruction, the sample instruction is the target instruction of the execute-type instruction. Directed sampling may occur when in the cycle-count or instruction-count mode. Count sampling continues in conjunction with directed sampling and any of its resulting actions, and is not otherwise affected, except that if the sample instruction determined from count sampling is the same instruction determined by directed sampling, two reporting groups are not stored.

Whatever the sampling mode is, when a sample instruction is identified by execution of the RINEXT instruction, a reporting group is stored. However, the run-time-instrumentation controls Y 738, Z 739, Qs 614, and Ps 612 continue to be effective.

Cycle-count and instruction-count sampling each determine an approximate interval which is subject to an amount of variability based on internal system events and exception conditions. The countdown begins when run-time instrumentation transitions from disabled to enabled. Directed sampling is subject to a lesser amount of variability, depending on any event that can be interposed between completion of RINEXT and the NSI. Of note, an interruption can cause what was thought to be the NSI to no longer be the NSI.

Sampling, regardless of the mode, identifies a sample instruction. Once a sample instruction is identified, collection stops upon completion of execution of the sample instruction and reporting begins. The various reporting controls that govern reporting then apply. Collection resumes when store of the reporting group is made pending.

When not in the transactional-execution mode, store of a reporting group becomes pending upon completion of execution of a sample instruction. When in the transactional-execution mode, upon completion of execution of a sample instruction, store of a reporting group is deferred until the transaction ends and then becomes pending. When the store of a reporting group is deferred or pending, it may be purged if any of the following interruptions is recognized: 1) program interruption; 2) exigent machine-check interruption; 3) restart interruption; and 4) supervisor-call interruption.

Any pending I/O, external, and repressible machine-check interruption remains pending until either the reporting group has been stored or the run-time-instrumentation controls determine that a reporting group is not to be stored.

Each mode may or may not allow a different set of reporting controls. When the sampling mode is either instruction count or cycle count, but directed sampling is also used, it is possible for the same sample instruction to be identified by multiple sampling methods. When this occurs, and the reporting controls to be used differ according to the sampling mode, the reporting controls associated with directed sampling apply.

Precise determination of an interval meant to sample a particular instruction is generally not feasible, due to asynchronous and unsolicited system events that may occur. Instead, the RINEXT instruction can be used to more-closely designate a sample instruction.

When in cycle-count mode or instruction-count mode, the RINEXT instruction can be issued in too close a proximity to the sample instruction identified from instruction-count or cycle-count sampling. The contents of the associated reporting group are as if the sample instruction were identified as the NSI of the RINEXT instruction and not as if a cycle-count or instruction-count identification of the sample instruction applied.

Execution of RINEXT may execute as a no-operation if any one or more of the following exception conditions is met:
1. Run-time-instrumentation controls are not valid.
2. In the problem state, Ps 612 of the current run-time-instrumentation controls is zero, indicating that problem-state reporting is not permitted.
3. In the supervisor state, Qs 614 of the current run-time-instrumentation controls is zero, indicating that supervisor-state reporting is not permitted.
4. The N-bit 710 of the current run-time-instrumentation controls is zero, indicating that the RINEXT instruction itself is not permitted.

5. Storage is suppressed.
6. A field in the current PSW indicates that run-time instrumentation is disabled.
7. A model-dependent threshold would be exceeded. The number of times RINEXT has been issued in a period of time has exceeded a model-dependent limit.
8. A program-buffer-full condition exists.
9. A run-time-instrumentation-halted condition exists.
10. The next, sequential instruction is a start interpretive execution instruction.
11. The next, sequential instruction is a supervisor call instruction.

Figure 8:
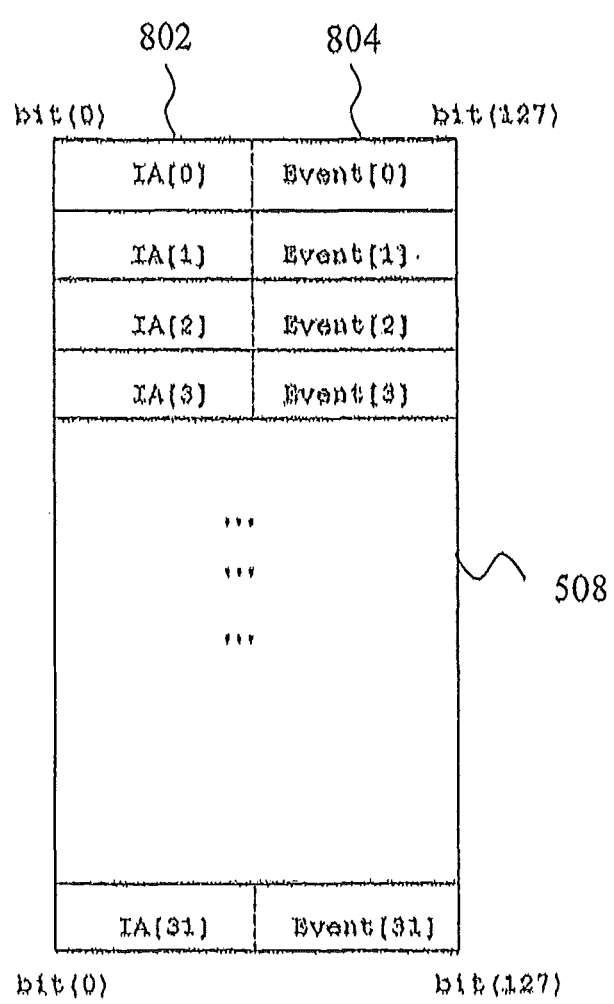
FIG. 8 depicts a collection buffer in accordance with an embodiment.

Turning to FIG. 8, an embodiment of collection buffer 508 is generally shown. As described previously, when run-time instrumentation is enabled during program execution, run-time-instrumentation data is collected within the processor 106. In an embodiment, the place where data is collected within the processor 106 is the collection buffer 508, and optionally an instruction-data buffer. In an embodiment, the collection buffer 508 is an internal buffer of the processor 106 that is used to save the most recent records collected. When a sample trigger point is detected, the records are copied from the collection buffer 508 into the program buffer 522 as part of a reporting group that is written to the program buffer 522. In an embodiment, the records are copied from the collection buffer in a non-destructive manner.

The collection buffer 508 may be referred to as a "hardware collection buffer" because the collection buffer 508 is located in the processor and in an embodiment implemented as an array of register pairs representing instruction address 802 and event metadata 804 of a given event. In an embodiment, the instruction-data buffer is also implemented by an array of register pairs. An example of an event is a taken branch for which the register pair may hold the instruction address of the branch, and the metadata may hold the target of the branch as well as information regarding the historic behavior of the branch. In an embodiment, the registers pairs are ordered and updated sequentially as events occur in the instruction stream. A counter is maintained to indicate the index of the most recently updated entry in the array. In an embodiment the collection buffer 508 is a circular buffer, and when the collection buffer 508 is full, the next event overwrites the first entry in the array, and sequential updating of the array's register pairs re-starts on subsequent events. As such, assuming an array CB[0] to CB[N−1] and a counter i indicating the latest updated index, the trace of events captured would be represented by the sequence CB[i], CB[i−1] . . . CB[1], CB[0], CB[N−1], CB[N−2] . . . CB[i+1]. In another embodiment, two pointers are used: a head pointer pointing to the oldest entry in the buffer, and a tail/current pointer pointing to the newest entry in the buffer.

Events that represent a state of the processor 106 at any given execution point are captured sequentially in the collection buffer 508. The collection buffer 508 is used to capture a set of records whose contents report on events recognized by the processor 106 during program execution (e.g., execution of one or more taken branches, transactional-execution abort events, the operand of a RIEMIT instruction, etc.). In an embodiment the events recognized depend on the contents of the RICCB shown in FIG. 7. Entries in the embodiment of the collection buffer 508 shown in FIG. 8 include an event instruction address 802 and other relevant event metadata 804. Examples of event metadata 804 include, but are not limited to: the instruction address of a taken branch and its target including some information about the historic behavior of the branch; the instruction address of a RIEMIT instruction and a respective register value; and the address of a transaction abort instruction and a respective transaction recovery entry point.

The embodiment of the collection buffer 508 shown in FIG. 8 is capable of storing up to thirty-two entries (i.e., information about thirty-two events), with each instruction address 802 specified by sixty-four bits (e.g., bits 0:63), and event metadata 804 by sixty-four bits (e.g., bits 64:127). The size of the collection buffer ($R_{CB}$) is a model dependent count, representing a number of records. In the embodiment of the collection buffer 508 shown in FIG. 8, the byte size of the collection buffer is a multiple of the sixteen byte record size. In an embodiment, the size of the collection buffer is a number of records greater than or equal to the difference between the count of the largest reporting group ($R_{RG}$) of the model and the count of the records in a reporting group that are not acquired from the collection buffer ($R_{NC}$). Thus, in an embodiment, the size of the collection buffer is expressed as: $R_{CB} \geq (R_{RG}-R_{NC})$.

In an embodiment, contents of the collection buffer 508 and the instruction data buffer (if one is used) are purged or otherwise affected by the following events: (1) an interruption; (2) the PSW bit that turns on and off the run-time instrumentation facility (e.g., bit 24) changes from a one to a zero; and (3) when a sample instruction is identified when the run-time instrumentation facility is in a transactional-execution mode (in this case, further update of the collection data buffer 508 and instruction-data buffer stops and resumes when the transaction ends, at which time, a store of the reporting group is pending and the collection buffer 508 and instruction-data buffers are purged.

In an embodiment, such as the emulated host computer system shown in FIG. 1B, the host computer provides shared access to the run-time instrumentation facility and a save/restore run-time instrumentation state for each distinct user. The saved run-time instrumentation state is stored using registers and/or memory belonging to the host.

In embodiments, additional capabilities can affect data collection and may be viewed as providing additional data-collection points while not substantially disturbing the regular instruction-count or cycle-count sampling described previously. These include execution of a RIEMIT instruction, which collects the value of a general register by storing it into the collection buffer 508. In addition, the data-collection control bits in the run-time instrumentation controls described previously can be used to customize the types of data collected (e.g., the E, C, R, and B control bits). In this manner, the type of data collected is programmable.

In an embodiment, an instruction-data buffer is implemented to collect model dependent sample instruction data that is used to construct a run-time-instrumentation instruction record. The instruction-data buffer collects data from an instruction in anticipation of being available when the instruction is identified as a sample instruction. In an embodiment, the instruction-data buffer is a hardware buffer/storage location in the processor where information about an instruction that would become the trigger as a sample point is saved, so that during the log out process, it can be written out together with data from the collection buffer 508. Similar to the collection buffer 508 it includes the instruction address, and meta-data associated with that instruction. The metadata in the instruction-data buffer is often machine dependent and may include, but is not limited to: cache miss related information, and branch prediction related information.

In accordance with embodiments, other data collected may not be from the collection buffer 508 and not from the instruction-data buffer. Examples include data used to form parts of the following: (1) the first record of a reporting group: timestamp or begin record; and (2) additional types of records may be created for every reporting group and thus not stored in the collection buffer 508, such records, when present, may be placed in the extra or machine-dependent section of a reporting group. These system generated records are referred to herein as "system information records."

FIG. 9 depicts a high-level example of a reporting group 900 stored to program buffer 522 at a sample point. The number of valid records from the collection buffer 508, represented by $R_{VCB}$, is in the range $0 \leq R_{VCB} \leq R_{CB}$ (where $R_{CB}$ is the size of the collection buffer 508). The size of a reporting group 900 in records, represented by $R_{RG}$, is equal to $2^{(RGS+1)}$, where RGS is the reporting group size as an exponent. A model-dependent number of records ($R_{NC}$), such as an instruction record, copied from a location other than the collection buffer 508 may or may not be copied non-destructively when used in a reporting group 900. In an embodiment, if the $R_{VCB}$ is less than $R_{RG}$-$R_{NC}$, then the remainder of the reporting group 900 is filled with filler type records, such that the requisite count of $R_{RG}$ records in the reporting group 900 is met. In the example of FIG. 9, $R_{RG}$=8, $R_{GS}$=2, and $R_{NC}$=4. In an embodiment $R_{RG}$ is in the range $2 \leq R_{RG} \leq 2^8$ records. In accordance with an embodiment, $R_{GS}$ is limited to a model dependent maximum that is less than seven, so the largest reporting group size in a model may be less than 256, but is still a power of two.

The example reporting group 900 shown in FIG. 9 includes a header section 902, a body section 904, an extra records section 906, and a footer section 908. The header section 902 may include a begin record or a timestamp record to hold status, tracking, and/or timing information. The body section 904 may include a variety of records for events and information sampled from collection buffer 508. Events and information may represent, for example, state information captured by an emit instruction, a transactional-execution abort, a call, a return, a branch, and filler. The extra records section 906 may include model-dependent records. The footer section 908 can include an instruction record containing information about execution of a sample instruction.

In accordance with an embodiment, the first record of a reporting group 900 is in the header section 902 and is either a begin record or a timestamp record to hold status, tracking, and/or timing information. A begin record is stored for the first reporting group 900 stored in a program buffer 522 (i.e., when the RCA 706 is equal to the ROA 702). A timestamp record is stored as the first record of each subsequent reporting group. Neither the begin record nor the timestamp record are acquired from the collection buffer 508 and thus they are part of the $R_{NC}$ count. When $R_{RG}$ equals $R_{NC}$, the body is null and no records from the collection buffer 508 are stored in the reporting group. When $R_{RG}$ is greater than $R_{NC}$ and $R_{NC}$ is equal to two, the contents of records one through $R_{RG}$-$R_{NC}$ of a reporting group are in the body section of a reporting group 900 and are acquired from the collection buffer 508.

The collection buffer records stored in the body of a reporting group 900 are organized from oldest to newest in accordance with an embodiment, with the newest record being stored in record $R_{RG}$-$R_{NC}$ when the collection buffer 508 has a sufficient number of valid records. When multiple records from the collection buffer 508 are stored as part of a reporting group 900, record one is the oldest collection buffer record reported, although the collection buffer 508 may have records even older that do not fit into the body, since the newest record in the collection buffer 508 must be reported. If the number of valid records in the collection buffer 508 is insufficient to fill a reporting group 900, one or more filler records are used to fill as many reporting group records as necessary, starting at the record immediately following the newest collection buffer record. That is, when necessary filler-type records are placed at the bottom of the body section 904.

When $R_{RG}$ is greater than $R_{NC}$, and $R_{NC}$ is greater than two, the contents of records ($R_{RG}$-$R_{NC}$+1) through ($R_{RG}$-2) are the extra section 906 of a reporting group 900 and contain one or more model dependent or extra records. When $R_{NC}$ is equal to two, the extra section 906 is null and no extra records are stored. Extra or model dependent type records in the extra section 906 occupy the space required and any remaining space becomes part of the body section 904.

In an embodiment, record $R_{RG}$-1 of a reporting group 900 is the footer section 908 and contains an instruction record representing a sample instruction. The instruction record is not acquired from the collection buffer 508 and is partially acquired from the instruction-data buffer.

According to an embodiment, a reporting group 900 is stored at an integral boundary of the byte size of the reporting group in program buffer 522.

When the store of a reporting group 900 is attempted, either all records of the group are stored or fewer records are stored. The RCA 706 is advanced only if all the records in the reporting group 900 are stored. In an embodiment, when a reporting group 900 is stored, the records in the reporting group 900 are not stored in any particular order. However, after all records of the reporting group 900 have been stored, the begin record is updated.

In an embodiment, low address protection, dynamic address translation (DAT) protection, and/or key controlled protection apply to a store of a reporting group 900. Key controlled protection obtains the key from the run-time instrumentation controls (e.g., key 626) rather than the current PSW. The address space used is either home or primary as specified by a run-time instrumentation control block (e.g., H bit 608). If an access exception is recognized at either the reporting group location or the begin record location, or both, neither store is performed and the contents of the reporting group are not stored.

In an embodiment, the RCA 706 is incremented by sixteen for each record of the reporting group stored. The actual update is performed once per reporting group 900, incrementing by the aggregate size of the reporting group 900. Such incrementing of the RCA 706 is referred to herein as an advance of the current address. Thus, a successful store of a reporting group 900 is represented by whether or not the RCA 706 is advanced and a field storing the number of reporting groups (NRG) in the begin record is incremented by one. The RCA 706 is not advanced when a run-time instrumentation halted condition is recognized. A program buffer full condition exists when the RCA 706 is equal to the sum of one plus the RLA 704 (RCA=1+RLA). When the program buffer full condition exists, in accordance with an embodiment, a reporting group 900 is not stored. The program buffer full condition is recognized when the RCA 706 is advanced and causes the condition to exist. When the RCA 706 is advanced and the program buffer full condition is not recognized, if the advanced address has crossed a page boundary, an access exception may be recognized. Such an access exception is indicated as a side-effect store access. The measurement alert external interruption caused by recognition of the program buffer full condition is referred to herein as a buffer full interruption.

When the program buffer full condition is recognized, the following actions in the indicated order may be performed by an embodiment:

1. A bit in a stop (S) field in the begin record is set to one to indicate the existence of a program buffer full condition.
2. A buffer full interruption is made pending by setting a bit in a run-time instrumentation control block (e.g., L bit 624) to one. The buffer full interruption remains pending until the L bit is zeroed. The L bit may be zeroed by any of the following: successful execution of a LRIC instruction which specifies L as zero; presentation of the buffer full interruption; a CPU reset; or successful execution of a MRIC instruction which implicitly sets L to zero if the program buffer full condition is not loaded.

In an embodiment, while the program buffer full condition exists, the following consequences apply: execution of RINEXT performs no operation; execution of RIEMIT performs no operation; it is model dependent whether further decrementing of the interval occurs, if it does occur, it is also model dependent whether it is re-initialized to the scaling factor (SF) value in the control block (e.g., SF 740) upon being decremented to zero, if the interval is decremented to zero then a sample instruction is not recognized; and execution of the other run-time-instrumentation instructions are not affected.

In an embodiment, a run-time instrumentation halted condition first exists when a version code in the timestamp record of the reporting group 900 to be stored does not equal a version code in the begin record of the reporting group 900, and continues until run-time instrumentation is resumed after a change to the run-time instrumentation controls (e.g., a control block) which eliminates the potential inequality. The run-time instrumentation halted condition is initially recognized at the point where the begin record is recognized. The measurement alert external interruption caused by recognition of the run-time instrumentation halted condition is referred to herein as a run-time instrumentation halted interruption. When the run-time instrumentation halted condition is recognized, the following steps, in the indicated order, apply.

1. A halted (H) field in the begin record is set to one.
2. A run-time instrumentation halted interruption is made pending by setting the G bit (e.g., G bit 62) in a control block to one. The run-time instrumentation halted interruption remains pending until it is cleared. In an embodiment it is cleared by any of the following: successful execution of an LRIC instruction which specifies the G bit as zero; presentation of the run-time instrumentation halted interruption; CPU reset; successful execution of a MRIC instruction which implicitly sets G to zero if the RCA 706 that equals the ROA 702 is loaded (this is also a clearing of the run-time instrumentation halt condition).

While the run-time instrumentation halted condition exists, the following consequences apply: 1. execution of RINEXT performs no operation; 2. execution of RIEMIT performs no operation; 3. It is model dependent whether further decrementing of the interval (e.g., RSIC 742) occurs, if it does occur then it is also model dependent whether it is re-initialized to the SF value (e.g., SF 740) upon being decremented to zero, if the interval is decremented to zero then a sample instruction is not recognized; 4. no additional reporting groups 900 are stored; 5. the RCA 706 is not advanced; and 6. execution of the other run-time instrumentation instructions is not affected. If the G bit is loaded as a one during execution of a LRIC or a MRIC instruction, the run-time instrumentation halted interruption is made pending. The G bit is implicitly set to zero when a MRIC instruction specifies that the ROA 702 equals the RCA 706. If U bit 622 in the run-time instrumentation controls is equal to zero, a run-time instrumentation halted interruption is disabled.

Figure 10:
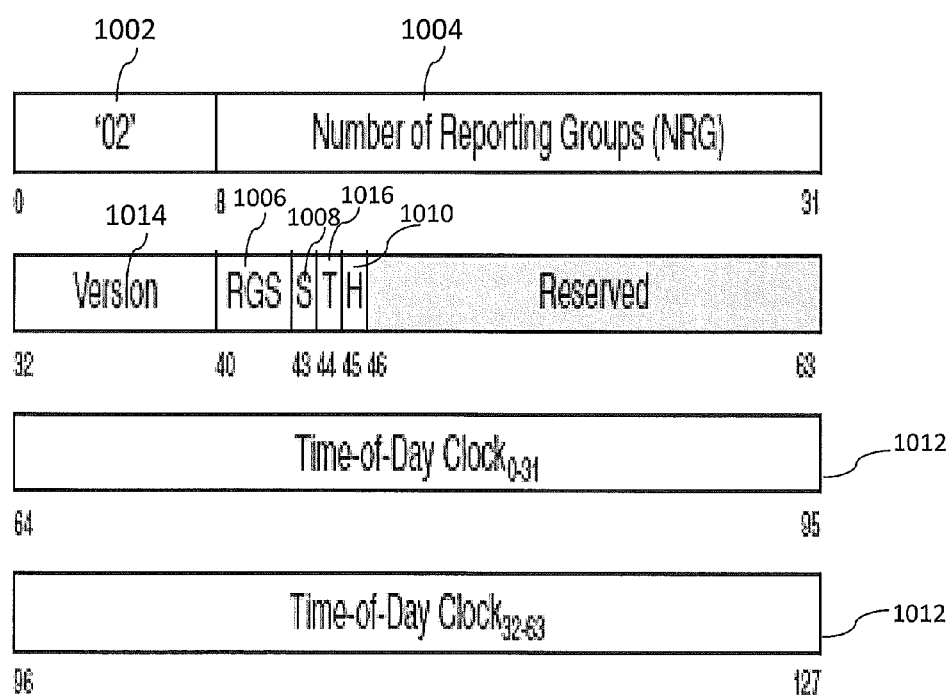
FIG. 10 depicts an embodiment of a begin record in a reporting group.

Turning now to FIG. 10, an embodiment of a begin record 1000 is generally shown. In an embodiment, the begin record 1000 is stored in the header section 902 for the first reporting group 900 stored in a program buffer 522 (i.e., when the RCA 706 is equal to the ROA 702), and the begin record 1000 is updated after the first reporting group 900 is stored to the program buffer 522. The begin record 1000 shown in FIG. 10 includes a record type field 1002, a number of reporting groups (NRG) field 1004, a version field 1014, a RGS field 1006, a stopped (S) field 1008, a capability (T) field 1016, a halted (H) field 1010, and a time of day (TOD) clock field 1012. The begin record 1000 is initialized using run-time instrumentation control values (e.g., from the RICCB, or other control block). The record type field 1002 is set to "02" to indicate that the record is a begin record 1000. The NRG field 1004 is set to one to indicate that there is one reporting group 900 stored in the program buffer 522. The NRG field 1004 is updated each time a new reporting group is stored to the program buffer 522. The version field 1014 stores an integer whose value indicates a functional engineering change level (e.g., of the instrumentation module 506). During initialization of the begin record 1000, the RGS field 1006 is updated with the current value of the RGS 1006 (e.g., from the RICCB) to indicate the size of all the reporting groups 900 in the program buffer 522. The S field 1008 is set to zero to indicate that the program buffer 522 is not full. If the program buffer 522 becomes full, the S field 1008 is changed to a one which indicates that a program buffer full condition exists. The T field 1016 is set to zero during initialization when the reporting group 900 represents a sample captured on a CPU operating at its CPU capability, and is set to one when the reporting group 900 represents a sample captured on a CPU operating at a secondary CPU capability. The H field 1010 is set to zero during initialization and then set to one if the run-time instrumentation has been halted due to reasons other than the buffer full condition. When the H field 1010 is equal to one, the G bit 620 in the RICCB is also set to one. The TOD clock field 1012 is set to indicate the time of day when the reporting group containing the begin record 1000 was originally stored. The reserved portions of the begin record 1000 (and any reserved portions in the rest of the reporting group records) do not have predictable values.

Figure 11:
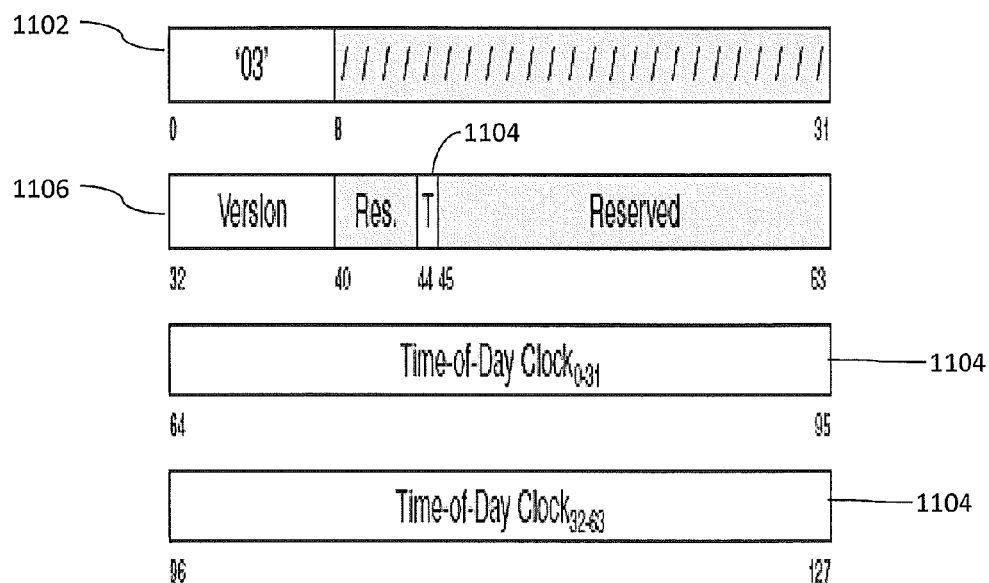
FIG. 11 depicts an embodiment of a timestamp record in a reporting group.

FIG. 11 is an embodiment of a timestamp record 1100 in the header section 902 of a reporting group 900. A timestamp record 1100 is stored as record zero (i.e., the first record) of every reporting group 900 other than the first reporting group 900 in the program buffer 522. A timestamp record 1100 is created when a reporting group 900 is stored to the program buffer 522 and the ROA 702 does not equal the RCA 706. The embodiment of the timestamp record 1100 shown in FIG. 11 includes a record type 1102, a version field 1106, a capability (T) field 1108, and a TOD clock field 1104. The record type 1102 is set to "03" to indicate that the record is a timestamp record 1100. The version field 1106 stores an integer whose value indicates a functional engineering change level (e.g., of the instrumentation module 506). The T field 1108 is set to zero during initialization when the reporting group 900 represents a sample captured on a CPU operating at its CPU capability, and is set to one when the reporting group 900 represents a sample captured on a CPU operating at a secondary CPU capability. The TOD clock field 1104 is set to indicate the time of day when the reporting group 900 containing the timestamp record 1100 was originally stored.

The body section 904 of the reporting group 900 may include a variety of events and information sampled from the collection buffer 508. Events and information may represent, for example, state information captured by an emit instruction, a transactional execution mode abort, a call, a return, a branch, and filler.

Figure 12:
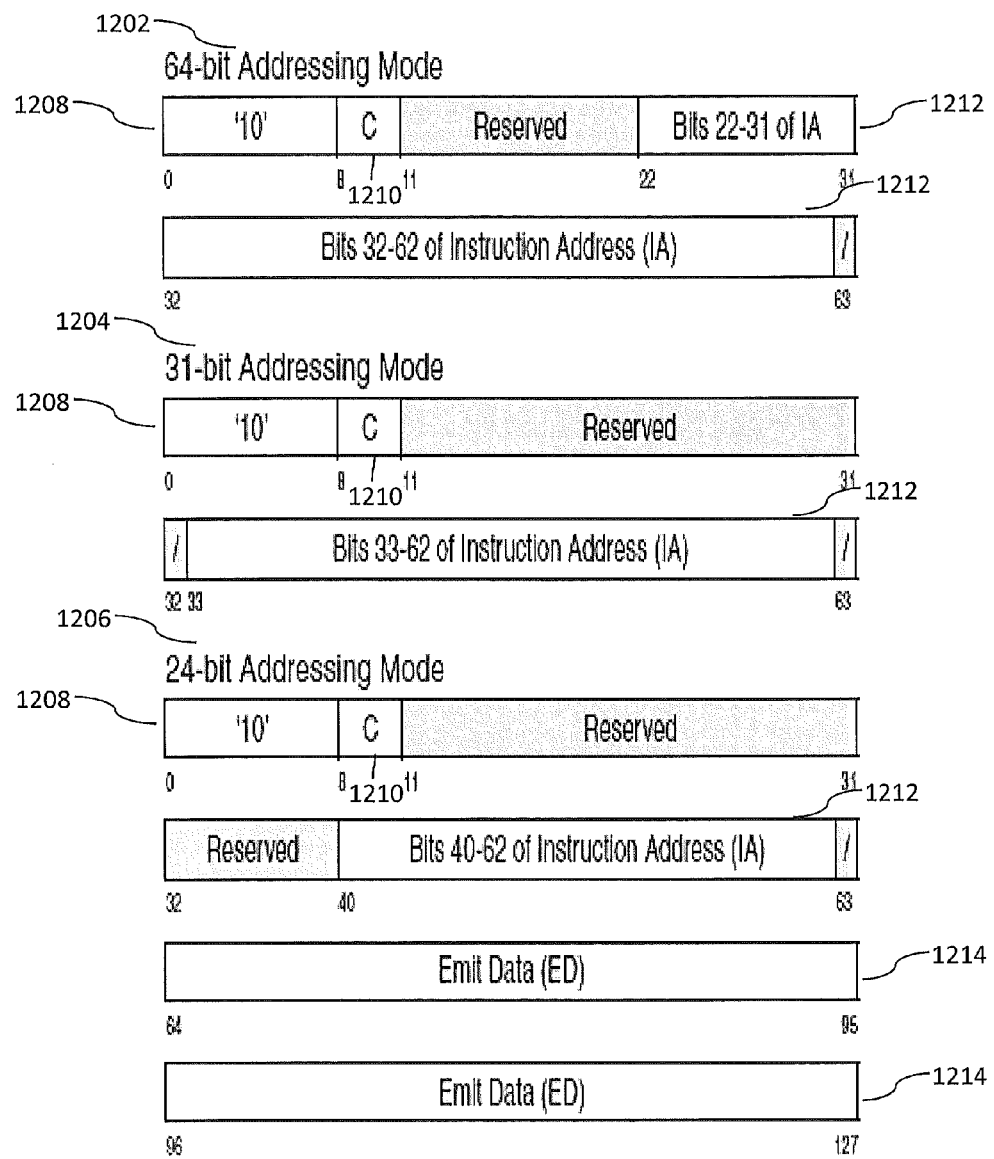
FIG. 12 depicts embodiments of emit records in a reporting group.

An emit record is created and stored in the body section 904 of a reporting group 900 in the program buffer 522 upon a successful execution of a RIEMIT instruction. FIG. 12 illustrates three different embodiments of an emit record 1202, 1204 and 1206 that vary based on whether a 64, 31 or 24 bit addressing mode is being implemented. The emit records 1202, 1204 and 1206 all include a record type field 1208, an instruction address code (C) field 1210, an instruction address field 1212, and an emit data field 1214. The record type field 1208 is set to "10" to indicate that the record is an emit record 1202, 1204 or 1206. In an embodiment, the C field 1210 is an unsigned integer whose value is a code which describes how the instruction address bit positions in the current PSW are represented in the emit record 1202, 1204 and 1206. When the C field 1210 is equal to zero, bit positions 22-62 of the instruction address (IA) of the current PSW are placed in bit positions 22-62 of the record and bit positions 0-21 of the instruction address are all zeros. When the C field 1210 is equal to one, bit positions 22-62 of the instruction address of the current PSW are placed in bit positions 22-62 of the record and bit positions 0-21 of the instruction address are not all zeros. When the C field is equal to one, a maximum address exceeded bit (e.g., MAE 712) in the run-time instrumentation control block is set to one if the record is stored as part of a reporting group 900. The instruction address field 1212 contains the instruction address of the RIEMIT instruction or execute type instruction if the RIEMIT was the target of an execute type instruction. As shown in FIG. 12, the instruction address field 1212 varies depending on the addressing mode (e.g., 64, 31 or 24 bit). The emit data field 1214 includes the data from the general register specified by the RIEMIT instruction.

Figure 13:
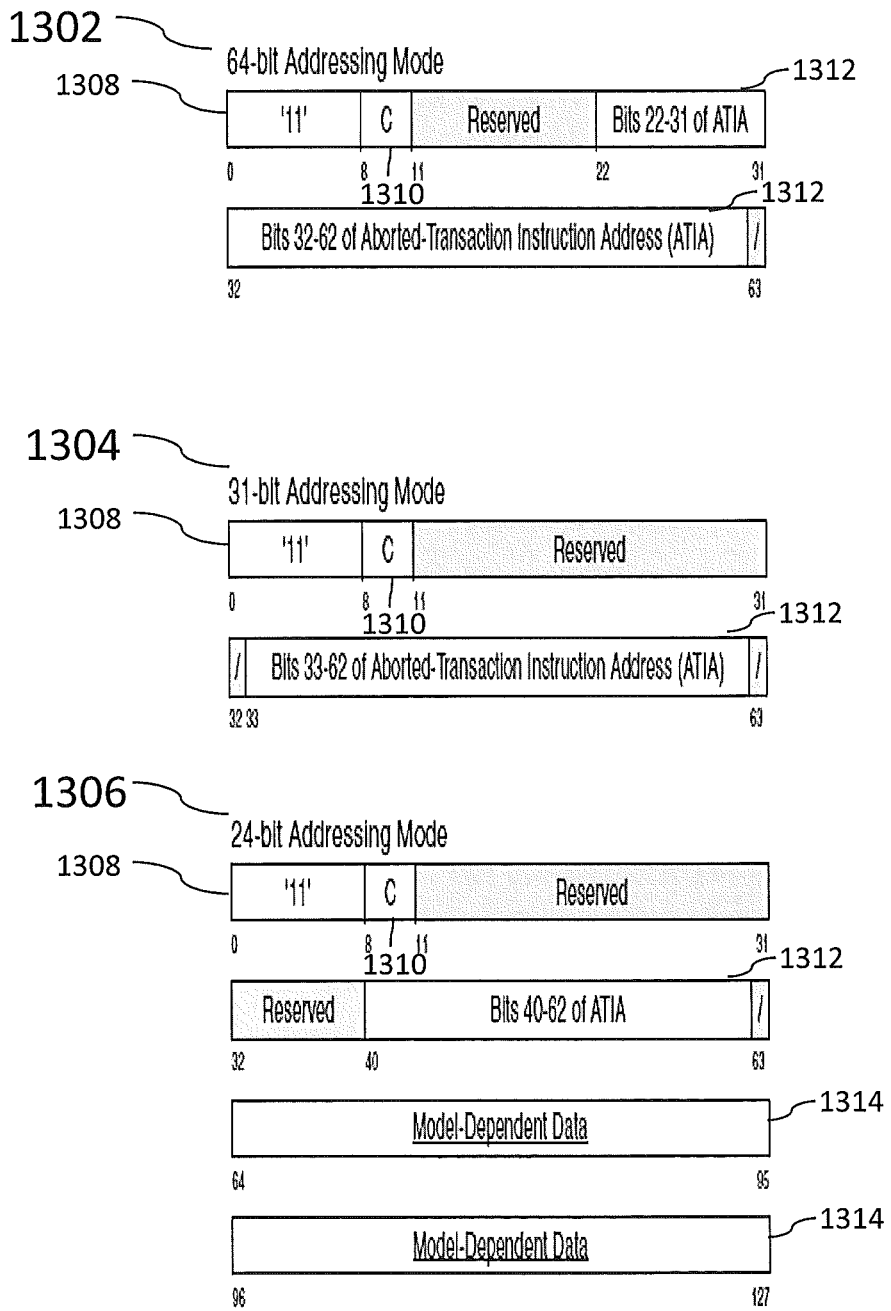
FIG. 13 depicts embodiments of abort records in a reporting group.

A transactional execution mode abort record is created by either an implicit abort or by execution of transaction abort and stored in the body section 904 of a reporting group 900 in the program buffer 522. FIG. 13 illustrates three different embodiments of an abort record 1302, 1304 and 1306 that vary based on whether a 64, 31 or 24 bit addressing mode is being implemented. The abort records 1302, 1304 and 1306 all include a record type field 1308, an instruction address code (C) field 1310, an instruction address field 1312 and a model dependent field 1314. The record type field 1308 is set to "11" to indicate that the record is an abort record 1302, 1304 or 1306. In an embodiment, the C field 1310 is an unsigned integer whose value is a code which describes how the instruction address bit positions in the current PSW are represented in the abort record 1302, 1304 and 1306, and has properties similar to the C field 1210 described above with respect to FIG. 12. The instruction address field 1312 contains the instruction address of the aborted instruction or execute type instruction if the aborted instruction was the target of an execute type instruction. As shown in FIG. 13, the instruction address field 1312 varies depending on the addressing mode (e.g., 64, 31 or 24 bit). The model dependent data field 1314 includes any model dependent data associated with the abort.

Figure 14:
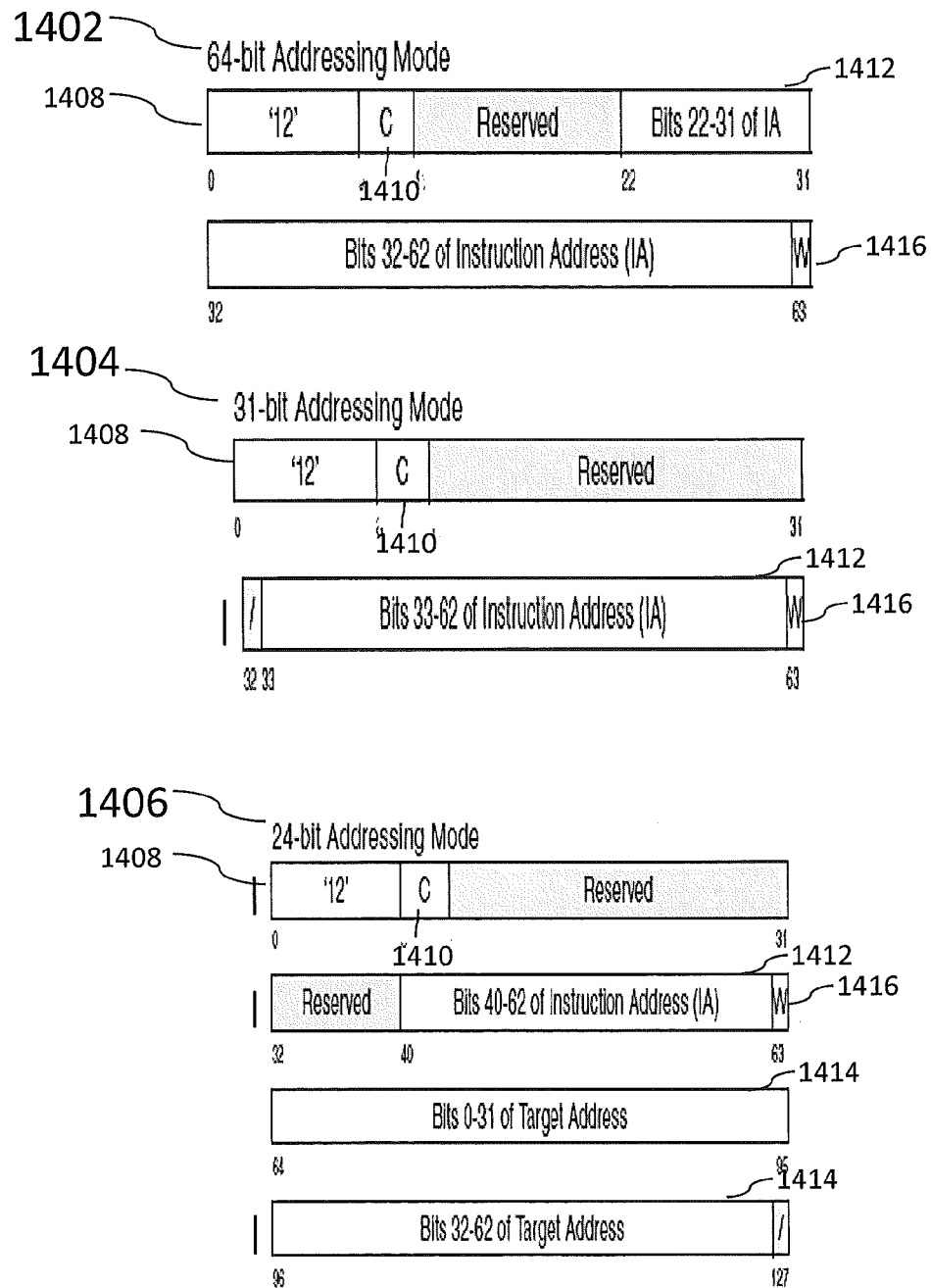
FIG. 14 depicts embodiments of call records in a reporting group.

A call record is created by execution of a branch instruction which is categorized as a call type branch instruction. The call record is stored in the body section 904 of a reporting group 900 in the program buffer 522. In an embodiment, call type branches include: BRANCH AND SAVE (BASR) when the R2 field is nonzero, BRANCH AND SAVE (BAS), BRANCH RELATIVE AND SAVE LONG, RANCH RELATIVE AND SAVE, BRANCH AND LINK (BALR) when the R2 field is nonzero, BRANCH AND LINK (BAL), and BRANCH AND SAVE AND SET MODE when the R2 field is nonzero. FIG. 14 illustrates three different embodiments of a call record 1402, 1404 and 1406 that vary based on whether a 64, 31 or 24 bit addressing mode is being implemented. The call records 1402, 1404 and 1406 all include a record type field 1408, an instruction address code (C) field 1410, an instruction address field 1412, a well behaved (W) field 1416, and a target address field 1414. The record type field 1408 is set to "12" to indicate that the record is a call record 1402, 1404 or 1406. The C field 1410 is an unsigned integer whose value is a code which describes how the instruction address bit positions in the current PSW are represented in the call record 1402, 1404 and 1406, and it has properties similar to the C field 1210 described above with respect to FIG. 12. The instruction address field 1412 contains the address of the branch instruction or execute type instruction if the branch was the target of an execute type instruction. A W field 1414 having a value of one indicates that the branch was predicted correctly, and a value of zero indicates that the branch was not correctly predicted. The target address field 1414 contains the branch target address (also referred to as the "called location").

Return records and transfer records in the body section 904 of a reporting group 900 in the program buffer 522 have the same format as the call records 1402 1404 and 1406. In an embodiment, a return record has a record type field of "13" and is created by execution of a return type branch instruction such as a BRANCH ON CONDITION (BCR) when the R2 field is nonzero and the mask is 15, BRANCH ON CONDITION (BC) when the J bit is one and the mask is 15, and BRANCH AND SET MODE when the R2 field is nonzero. For the return record, the instruction address field contains the address of the branch instruction or execute type instruction if the branch as the target of an execute type instruction, and the target address field contains the return location.

In an embodiment, a transfer record has a record type field of "14" and is created by execution of a return type branch instruction such as: a. BRANCH ON CONDITION (BCR) when the R2 field is nonzero and the mask is in the range 1-14; b. BRANCH ON CONDITION (BC) when the J bit is zero or the mask is in the range 1-14; c. BRANCH ON COUNT (BCT, BCTR, BCTG, BCTGR); d. BRANCH ON INDEX HIGH (BXH, BXHG); e. BRANCH ON INDEX LOW OR EQUAL (BXLE, BXLEG); f. BRANCH RELATIVE ON CONDITION (BRC); g. BRANCH RELATIVE ON CONDITIONLONG (BRCL); h. BRANCH RELATIVE ON COUNT (BRCT,BRCTG); i. BRANCH RELATIVE ON COUNT HIGH (BRCTH); j. BRANCH RELATIVE ON INDEX HIGH (BRXH, BRXHG); k. BRANCH RELATIVE ON INDEX LOW OREQUAL (BRXLE, BRXLG); l. COMPARE AND BRANCH (CRB, CGRB); m. COMPARE AND BRANCH RELATIVE (CRJ,CGRJ); n. COMPARE IMMEDIATE AND BRANCH (CIB, CGIB); o. COMPARE IMMEDIATE AND BRANCH RELATIVE (CIJ, CGIJ); p. COMPARE LOGICAL AND BRANCH (CLRB, CLGRB); q. COMPARE LOGICAL AND BRANCH RELATIVE (CLRJ, CLGRJ); r. COMPARE LOGICAL IMMEDIATE AND BRANCH (CLIB, CLGIB); and s. COMPARE LOGICAL IMMEDIATE AND BRANCH RELATIVE (CLIJ, CLGIJ). The transfer record is created when the branch is taken. For the transfer record, the instruction address field contains the address of the branch instruction or execute type instruction if the branch as the target of an execute type instruction, and the target address field contains the return location.

Figure 15:
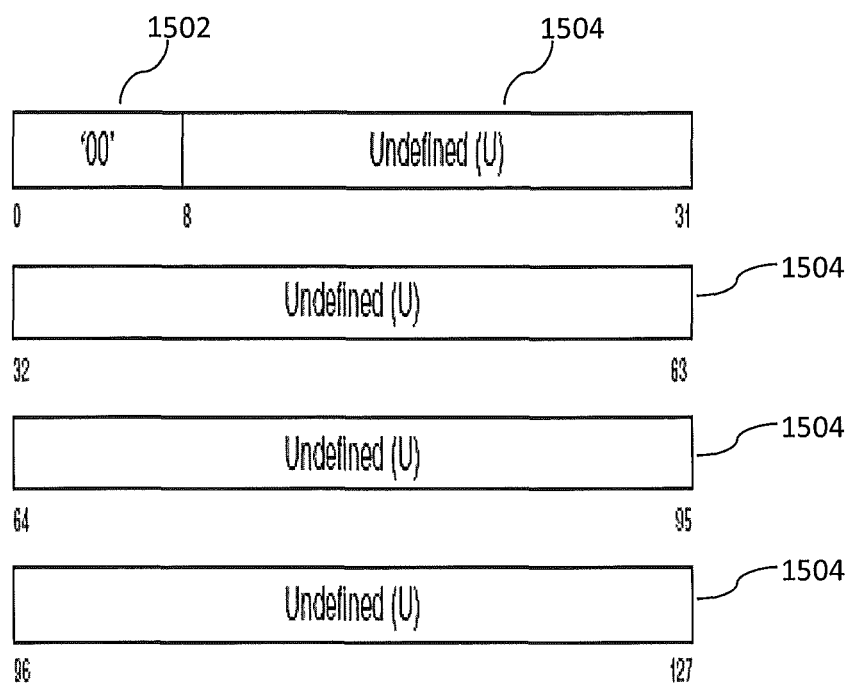
FIG. 15 depicts an embodiment of a fill record in a reporting group.

A filler record is used in the body section 904 of a reporting group 900 when the number of valid records in the collection buffer 508 is not sufficient to fill a reporting group 900 of the current RGS. FIG. 15 is an embodiment of a filler record 1500. The embodiment shown in FIG. 15 includes a record type 1502 set to "00" to indicate that the record is a filler record 1500 and the remaining bytes are undefined.

The extra records section 906 in the reporting group 900, when present, may contain model dependent records. In an embodiment, the format of an extra record is similar to the filler record 1500 except for the record type is set to "01" to indicate that the record is an extra record and the remaining bytes of the extra record contain model dependent data.

Figure 16:
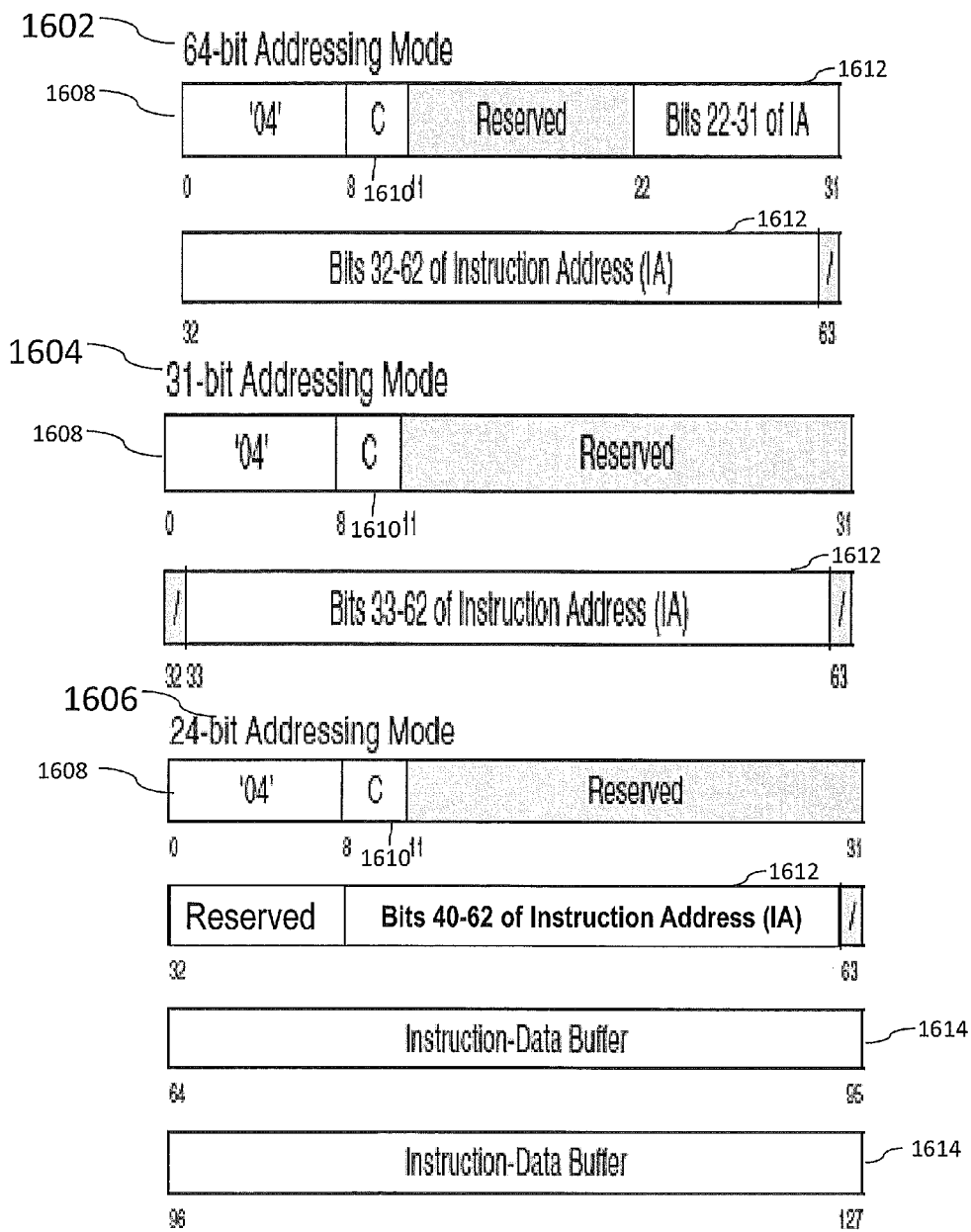
FIG. 16 depicts embodiments of instruction records in a reporting group.

In an embodiment, the footer section 908 of the reporting group 900 includes an instruction record containing information about execution of a sample instruction. An instruction record is created when a reporting group 900 is stored for a sample instruction. FIG. 16 illustrates three different embodiments of an instruction record 1602, 1604 and 1606 that vary based on whether a 64, 31 or 24 bit addressing mode is being implemented. The instruction records 1602, 1604 and 1606 all include a record type field 1608, an instruction address code (C) field 1610, an instruction address field 1612 and an instruction-data buffer (IDB) field 1614. The record type field 1608 is set to "04" to indicate that the record is an instruction record 1602, 1604 or 1606. The C field 1610 is an unsigned integer whose value is a code which describes how the instruction address bit positions in the current PSW are represented in the instruction record 1602, 1604 and 1606, and it has properties similar to the C field 1210 described above with respect to FIG. 12. The instruction address field 1612 contains the address of the sample instruction or execute type instruction if the sample instruction was the target of an execute type instruction. As shown in FIG. 16, the instruction address field 1612 varies depending on the addressing mode (e.g., 64, 31 or 24 bit). The IDB field 1614 includes data collected from the instruction-data buffer and the contents are model dependent.

Figure 17:
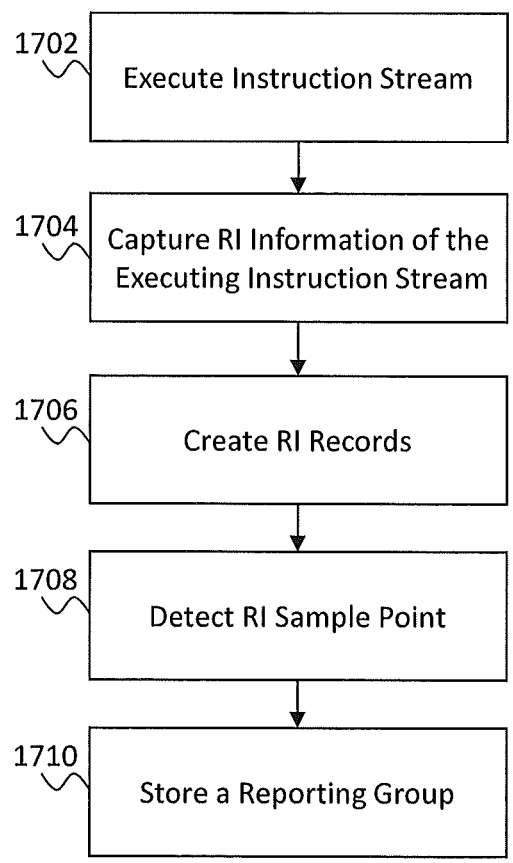
FIG. 17 depicts a process for run-time instrumentation reporting in accordance with an embodiment.

FIG. 17 depicts a process flow for run-time instrumentation reporting in accordance with an embodiment. In an embodiment, the processing shown in FIG. 17 is performed by instrumentation module 506. At block 1702, an instruction stream is executed on a processor, such as processor 106 or emulated processor 29. At block 1704, run-time instrumentation information of the executing instruction stream is captured, and at block 1706 run-time instrumentation records (such as those shown in collection buffer 508) are created based on the captured run-time instrumentation information. A run-time instrumentation sample point of the executing instruction is detected at block 1708. At block 1710, a reporting group, such as reporting group 900, is stored in a run-time instrumentation program buffer, such as program buffer 522. The storing includes determining a current address of the run-time instrumentation program buffer based on the run-time instrumentation controls. In an embodiment, the current address of the run-time instrumentation controls is the RCA 706 stored in the RICCB 700. The storing is based on the origin address (e.g., ROA 702) and the current address of the run-time instrumentation program buffer.

Figure 18:
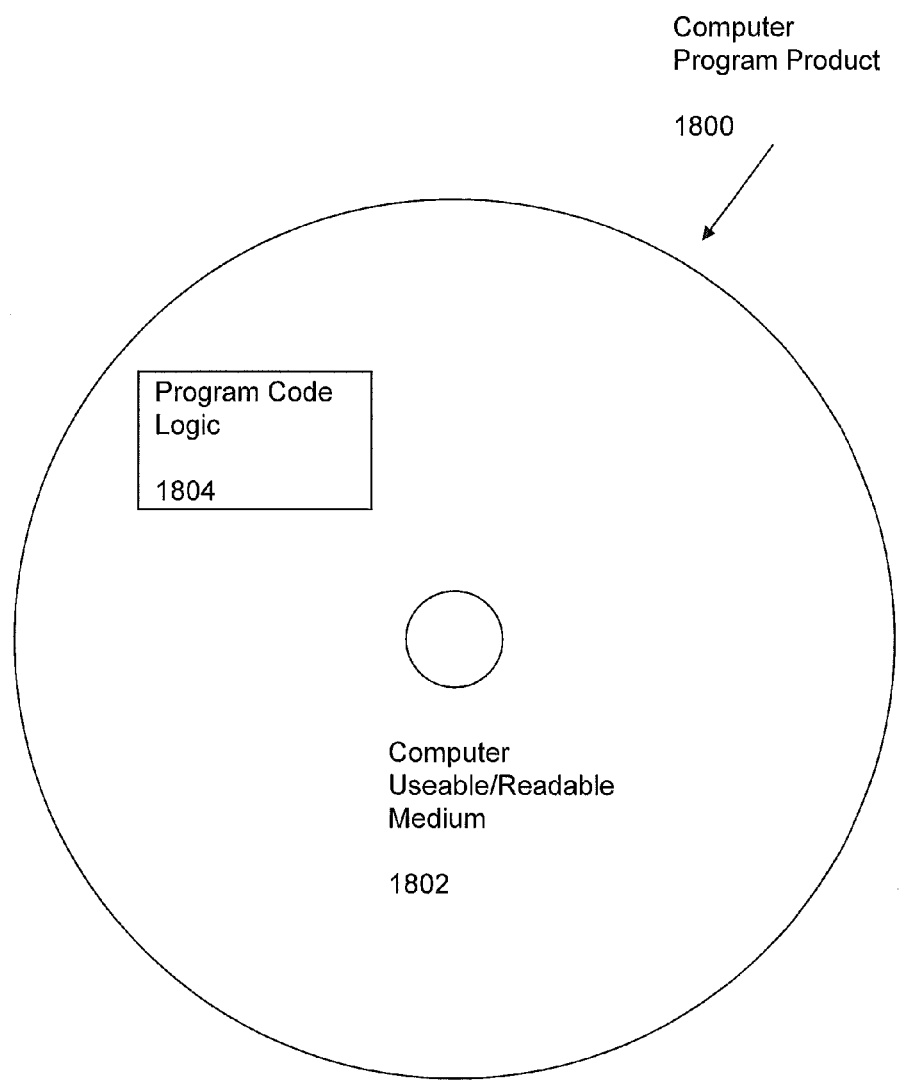
FIG. 18 illustrates a computer program product in accordance with an embodiment.

As described above, embodiments can be embodied in the form of computer-implemented processes and apparatuses for practicing those processes. An embodiment may include a computer program product 1800 as depicted in FIG. 18 on a computer readable/usable medium 1802 with computer program code logic 1804 containing instructions embodied in tangible media as an article of manufacture. Exemplary articles of manufacture for computer readable/usable medium 1802 may include floppy diskettes, CD-ROMs, hard drives, universal serial bus (USB) flash drives, or any other computer-readable storage medium, wherein, when the computer program code logic 1804 is loaded into and executed by a computer, the computer becomes an apparatus for practicing the invention. Embodiments include computer program code logic 1804, for example, whether stored in a storage medium, loaded into and/or executed by a computer, or transmitted over some transmission medium, such as over electrical wiring or cabling, through fiber optics, or via electromagnetic radiation, wherein, when the computer program code logic 1804 is loaded into and executed by a computer, the computer becomes an apparatus for practicing the invention. When implemented on a general-purpose microprocessor, the computer program code logic 1804 segments configure the microprocessor to create specific logic circuits.

Technical effects and benefits include the ability to extract run-time instrumentation data in a laboratory environment, for off-line analysis, and in live software environments within programs at run-time and under program control. A reporting group is stored into the program buffer whose location is determined from controls associated with the run-time instrumentation. Thus, instrumented data stored as reporting groups in the program buffer are available to the program for post-analysis (or even aggressive analysis during run-time instrumentation).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for run-time instrumentation reporting, the computer program product comprising:
    a non-transitory tangible storage medium readable by a processing circuit and storing instructions for execution by the processing circuit for performing a method comprising:
    executing an instruction stream of a computer program, the executing by a processor;
    determining, based on contents of an instrumentation control field in a program status word (PSW) associated with the computer program, that run-time instrumentation information of said executing instruction stream should be captured, wherein the contents of the PSW associated with the computer program persist during context switches by the processor;
    capturing, by the processor, the run-time instrumentation information of said executing instruction stream;
    based on said captured run-time instrumentation information, creating run-time instrumentation records;
    detecting a run-time instrumentation sample point of the executing instruction stream on the processor; and
    storing a reporting group in a run-time instrumentation program buffer, the storing based on the detecting a run-time instrumentation sample point, the storing comprising:
        determining a current address of the run-time instrumentation program buffer, the determining based on instruction accessible run-time instrumentation controls; and
        storing the reporting group into the run-time instrumentation program buffer based on an origin address of the run-time instrumentation program buffer and the current address of the run-time instrumentation program buffer, the reporting group comprising said created run-time instrumentation records.

2. The computer program product of claim 1, wherein the reporting group includes a predetermined number of run-time instrumentation records specified by the run-time instrumentation controls.

3. The computer program product of claim 1, wherein the method further comprises executing a program in a supervisor state to set any one of the origin address of the run-time instrumentation program buffer or the current address of the run-time instrumentation program buffer in the run-time instrumentation controls.

4. The computer program product of claim 3, wherein the program includes one of a load run-time instrumentation controls (LRIC) instruction and a modify run-time instrumentation controls (MRIC) instruction.

5. The computer program product of claim 1, wherein the method further comprises executing a program in a problem state to set the origin address of the run-time instrumentation program buffer in the run-time instrumentation controls, wherein the program includes a modify run-time instrumentation controls (MRIC) instruction.

6. The computer program product of claim 1, wherein the run-time instrumentation controls specify a number of records in each reporting group in the run-time instrumentation program buffer.

7. The computer program product of claim 1, wherein the run-time instrumentation program buffer is located in an address space that is accessible by an application program.

8. A system for run-time instrumentation reporting, the system comprising:
    a processor, the system configured to perform a method comprising:
    executing an instruction stream of a computer program, the executing by the processor;
    determining, based on contents of an instrumentation control field in a program status word (PSW) associated with the computer program, that run-time instrumentation information of said executing instruction stream should be captured, wherein the contents of the PSW associated with the computer program persist during context switches by the processor;
    capturing, by the processor, the run-time instrumentation information of said executing instruction stream;
    based on said captured run-time instrumentation information, creating run-time instrumentation records;
    detecting a run-time instrumentation sample point of the executing instruction stream on the processor; and
    storing a reporting group in a run-time instrumentation program buffer, the storing based on the detecting a run-time instrumentation sample point, the storing comprising:
        determining a current address of the run-time instrumentation program buffer, the determining based on instruction accessible run-time instrumentation controls; and
        storing the reporting group into the run-time instrumentation program buffer based on an origin address of the run-time instrumentation program buffer and the current address of the run-time instrumentation program buffer, the reporting group comprising said created run-time instrumentation records.

9. The system of claim 8, wherein the reporting group includes a predetermined number of run-time instrumentation records specified by the run-time instrumentation controls.

10. The system of claim 8, wherein the method further comprises executing a program in a supervisor state to set any one of the origin address of the run-time instrumentation program buffer or the current address of the run-time instrumentation program buffer in the run-time instrumentation controls.

11. The system of claim 10, wherein the program includes one of a load run-time instrumentation controls (LRIC) instruction and a modify run-time instrumentation controls (MRIC) instruction.

12. The system of claim 8, wherein the method further comprises executing a program in a problem state to set the origin address of the run-time instrumentation program buffer in the run-time instrumentation controls, wherein the program includes a modify run-time instrumentation controls (MRIC) instruction.

13. The system of claim 8, wherein the run-time instrumentation controls specify a number of records in each reporting group in the run-time instrumentation program buffer.

* * * * *